(12) United States Patent
Bulten et al.

(10) Patent No.: US 10,660,068 B2
(45) Date of Patent: May 19, 2020

(54) POSITION-BASED BROADCAST PROTOCOL AND TIME SLOT SCHEDULE FOR A WIRELESS MESH NETWORK

(71) Applicants: Stichting VU-VUMC, Amsterdam (NL); FOM-Nikhef, Amsterdam (NL)

(72) Inventors: Henk Jan Bulten, Amsterdam (NL); Johannes Franciscus Josephina Van Den Brand, Hilversum (NL)

(73) Assignees: STICHTING VU-VUMC, Amsterdam (NL); FOM-NIKHEF, Amsterdam (NL)

(*) Notice: Subject to any disclaimer, the term of this patent is extended or adjusted under 35 U.S.C. 154(b) by 0 days.

(21) Appl. No.: 14/896,610

(22) PCT Filed: Jun. 6, 2014

(86) PCT No.: PCT/EP2014/061874
§ 371 (c)(1),
(2) Date: Dec. 7, 2015

(87) PCT Pub. No.: WO2014/195477
PCT Pub. Date: Dec. 11, 2014

(65) Prior Publication Data
US 2016/0212729 A1 Jul. 21, 2016

(30) Foreign Application Priority Data
Jun. 7, 2013 (EP) .................................... 13171101

(51) Int. Cl.
*H04W 72/00* (2009.01)
*H04W 72/04* (2009.01)
(Continued)

(52) U.S. Cl.
CPC ........ *H04W 72/005* (2013.01); *H04B 7/2656* (2013.01); *H04W 52/0216* (2013.01);
(Continued)

(58) Field of Classification Search
None
See application file for complete search history.

(56) References Cited

U.S. PATENT DOCUMENTS 6,414,955 B1 * 7/2002 Clare ...................... H04L 41/12
370/390
6,785,547 B1 * 8/2004 Heiska .................. H04W 16/18
455/446
(Continued)

OTHER PUBLICATIONS

International Search Report and Written Opinion dated Jul. 4, 2014 for corresponding International Patent Application No. PCT/EP2014/061874 filed Jun. 6, 2014.
(Continued)

*Primary Examiner* — Faruk Hamza
*Assistant Examiner* — Cassandra L Decker
(74) *Attorney, Agent, or Firm* — Steven M. Koehler; Westman, Champlin & Koehler, P.A.

(57) ABSTRACT

A method for managing communication in a wireless mesh network comprising a plurality of wireless nodes and a wireless node for use in such network are described, wherein said method may comprise: providing a time slot schedule (frame), preferably a TDMA time slot schedule (frame), comprising one or more time slots, including a transmission time slot enabling a node to transmit a broadcast message, a reception time slot enabling a node to receive a broadcast message from one or more other nodes; and/or a sleep time slot for configuring said node in an idle state; and, assigning said time slots to nodes in said network on the basis of the position of said nodes in said network.

21 Claims, 11 Drawing Sheets

(51) Int. Cl.
*H04W 52/02* (2009.01)
*H04B 7/26* (2006.01)
*H04W 84/18* (2009.01)

(52) U.S. Cl.
CPC ..... *H04W 72/048* (2013.01); *H04W 72/0446* (2013.01); *H04W 84/18* (2013.01); *Y02D 70/00* (2018.01); *Y02D 70/144* (2018.01); *Y02D 70/162* (2018.01); *Y02D 70/164* (2018.01); *Y02D 70/22* (2018.01); *Y02D 70/449* (2018.01)

(56) References Cited

U.S. PATENT DOCUMENTS

| | | | |
|---|---|---|---|
| 6,816,460 B1* | 11/2004 | Ahmed | H04L 45/04 370/238 |
| 8,331,282 B2* | 12/2012 | Pandey | H04W 72/02 370/322 |
| 8,493,943 B1* | 7/2013 | Segall | H04W 40/32 370/338 |
| 2004/0221043 A1* | 11/2004 | Su | H04L 12/18 709/227 |
| 2005/0117530 A1* | 6/2005 | Abraham | H04W 52/0232 370/310 |
| 2007/0274272 A1* | 11/2007 | Joshi | H04L 1/0001 370/338 |
| 2008/0267159 A1* | 10/2008 | Mattsson | G08B 25/01 370/345 |
| 2009/0034446 A1* | 2/2009 | Adams | H04W 28/06 370/314 |
| 2009/0232038 A1* | 9/2009 | Gonzalez-Velazquez | H04B 7/2656 370/311 |
| 2010/0302947 A1* | 12/2010 | Leppanen | H04L 1/1867 370/241 |
| 2011/0213946 A1* | 9/2011 | Ajima | G06F 15/803 712/11 |

OTHER PUBLICATIONS

An Energy Efficient MAC in Wireless Sensor Networks to Provide Delay Guarantee (0), by Anirudha Sahoo, Venue: Local & Metropolitan Area Networks, 2007. LANMAN 2007. 15th IEEE Workshop on IEEE, Jun. 1, 2007, pp. 25-30.

Zorzi N, et al: Multihop performance of geographic random forwarding for ad hoc and sensor networks University of Ferrara, Ferrare, Emilia-Romagna, Italy DOI: 10.1109/GLOCOM.2003. 1258970 Conference: Global Telecommunications Conference, 2003. GLOBECOM '03. IEEE, vol. 7 Source: IEEE Xplore, vol. 7, Dec. 1, 2003, pp. 3948-3952.

A Survey on Position-Based Routing in Mobile Ad-Hoc Networks (2001), by Martin Mauve, Jörg Widmer, Hannes Hartenstein, IEEE Network, vol. 15, No. 6, pp. 30-39, Nov./Dec. 2001.

* cited by examiner

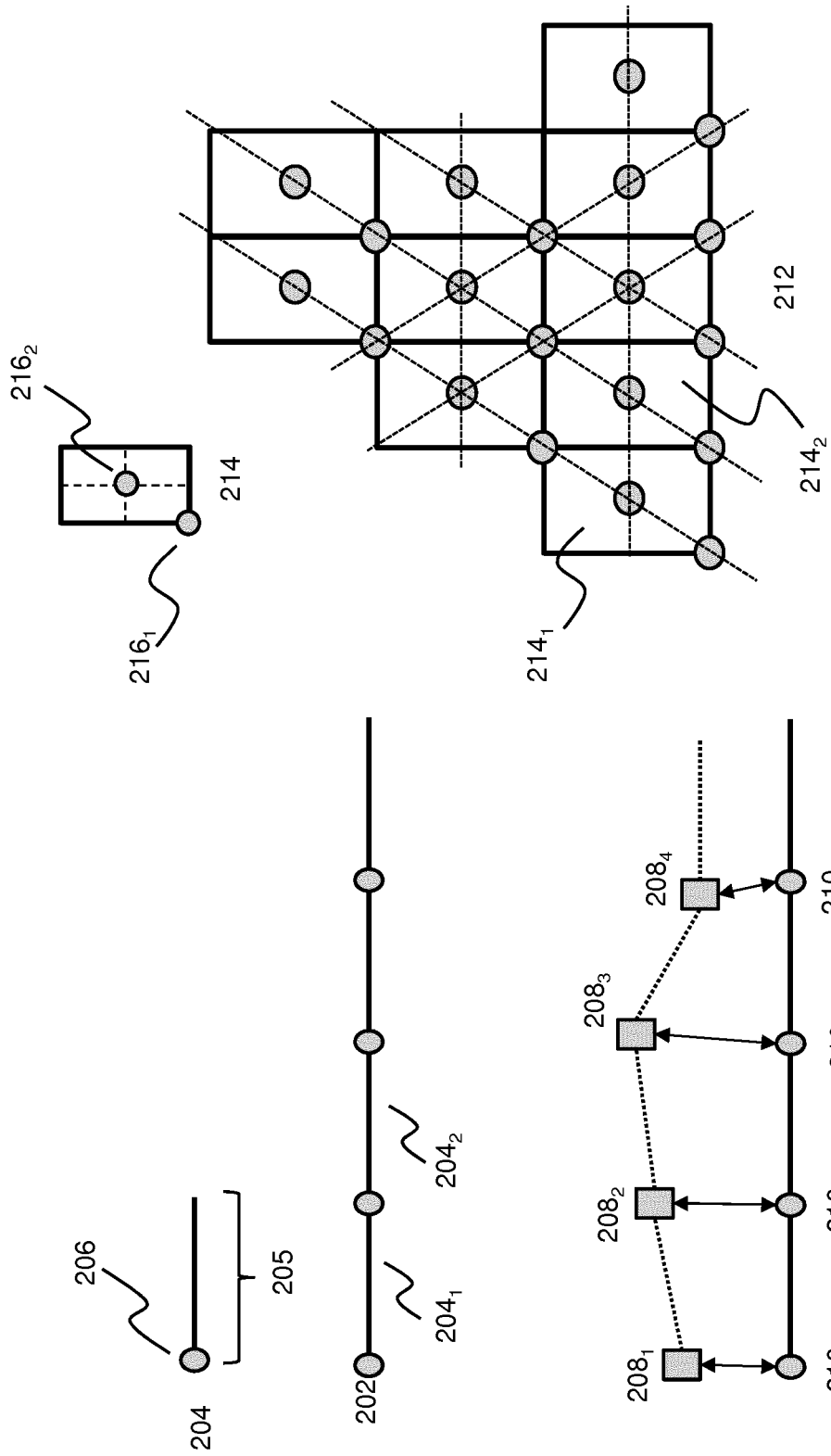

POSITION-BASED BROADCAST PROTOCOL AND TIME SLOT SCHEDULE FOR A WIRELESS MESH NETWORK

CROSS-REFERENCE TO RELATED APPLICATION

The present application is a national stage filing of International patent application Serial No. PCT/EP2014/061874, filed Jun. 6, 2014, and published as WO 2014/195477 A1 in English.

FIELD OF THE INVENTION

The invention relates to a broadcast protocol for a wireless mesh network, and, in particular, though not exclusively, to a method for managing communication in a wireless mesh network comprising a plurality of wireless nodes, a wireless node for use in a wireless mesh network; and, a computer program product using such method.

BACKGROUND OF THE INVENTION

The discussion below is merely provided for general background information and is not intended to be used as an aid in determining the scope of the claimed subject matter.

Wireless networks comprising wireless sensor and/or actuator devices may be applied in many fields, e.g. seismic-sensor networks used for geological exploration, heat or smoke detectors used in fire protection, or networks with sensors or actuators for monitoring or controlling devices such as traffic lights or the like. In these applications the layout of the wireless nodes, which are usually referred to as sensor nodes, is static in the sense that a position of a node does not change once it is part of the network.

Traditional protocols for wireless networks typically involve a type of point-to-point communications, which has the disadvantage that the message may not reach its destination when a node or link in the path is not reachable. This is why currently mesh networks are developed in which all routers communicate directly with each other. In such networks nodes or access points are allowed to communicate with other nodes without being routed through a central switch point thereby eliminating centralized failure. Currently ZigBee is a popular low-power short-range wireless radio communication standard IEEE 802.15.4 for use in such mesh network. A signal may "multi-hop" among its different nodes in order to circumvent obstructions as it seeks and ultimately finds its target node. These redundant communication paths provide a reliable route for communication.

Typically, data transmission through such networks is based on routing tables, which may be either established proactively (as known from the Destination Sequence Vector Routing scheme (DSVD)), reactive (such as the Ad-hoc On Demand Vector scheme (AODV)) or a combination thereof (e.g. the hybrid wireless mesh protocol (HWMP) as defined in IEEE 802.11s). The routing tables are typically established during a "route discovery and maintenance mode" of operation. A routing scheme based on routing tables has the disadvantage that the tables need to be updated every time changes are made in the network. Especially in large networks comprising e.g. a thousand nodes these routing updates may introduce sizable overhead.

The article of Mauve et al. "A survey on position-based routing in mobile ad hoc networks," Network, IEEE, vol. 15, no. 6, pp. 30-39, November/December 2001 describes position-based protocols for mobile ad-hoc networks that do not use routing tables for data transmission to a particular point in a mesh network. In such protocols a message comprises a destination and the nodes know the positions of their neighbors, which are constantly updated using a location service. An algorithm may be used to estimate which forward node is best suited for transporting data to a predetermined destination. Although no routing tables are used, these protocols require a location service that introduces a large overhead. This routing scheme however has the problem that when a package is sent forward to a node closer to the destination, it may get stuck in a local minimum wherein the receiving node cannot find a node closer to the destination than itself. This type of errors may compromise the reliability of the network.

A further problem is that a position-based protocol should not only provide highly reliable data transfer but should also enable low power data transmission and/or optimized performance with respect to other network and/or node parameters such as: equalization of power consumption in all or a predetermined part of the nodes in the mesh network; minimum (average) power consumption; minimum transport time for data acquisition at a sensor node to reception of the data at a data sink; maximum data throughput through the mesh network; minimum number of collisions or no collisions at all; constraints on the TDMA schedule for time slot allocation; degree of fault tolerance, etc.

Hence, from the above it follows that there is a need in the art for improved protocols, in particular position-based broadcast protocols, for use in a wireless mesh network and wireless (sensor) devices that are configured using such improved position-based broadcast protocol.

SUMMARY

The Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

In a first aspect the invention may relate a method for managing communication in a wireless mesh network comprising a plurality of wireless nodes, preferably a grid layout determining the positions of said nodes in said network, said method comprising: providing a time slot schedule (frame), preferably a TDMA time slot schedule (frame), said time slot schedule comprising one or more time slots, including a transmission time slot enabling a node to transmit a broadcast message, a reception time slot enabling a node to receive a broadcast message from one or more other nodes; and, a sleep time slot for configuring said node in an idle state; and, assigning time slots of said time slot schedule to a node in said network on the basis of the position of said node in said network, preferably on the basis of said grid layout and the position of said node in said grid layout.

A position-based time slot assignment is used in order to configure nodes in the mesh network in accordance with a predetermined state. The position of node in the network may be determined on the basis of a mathematical grid layout that represents the arrangement of nodes in the network. On the basis of the position of the node in the grid and the other nodes in the grid, transmit slots, receive slots and idle slots may be assigned to nodes in the network.

Position-based slot assignment may be used to avoid collisions of messages. For example, collision may be avoided by assigning transmit slots to nodes in the network such that the minimum distance between nodes with identical transmit slots can be configured to be N hop distances, N=3, 4, 5, 6, 7, . . . ), wherein a hop distance may be defined as the distance between to two directly adjoining nodes in the grid. Depending on the type of grid (and grid cell), the hop distance may be different in different directions. Position-based slot assignment also allows configuration of nodes such that when a node is transmitting, (a subset of) neighboring nodes are receiving. Moreover, position-based slot assignment further allows configuration of nodes such that one or more downstream nodes receiving a message from an upstream node also listens to the other downstream nodes when their transmit slot comes up.

In an embodiment, said method may comprise: assigning a transmission time slot to at least one first node in said mesh network; and, assigning one or more reception time slots in said time frame to one or more second nodes that are located within the transmission range of said first node, wherein said reception time slot at least partially overlaps with said transmit slot assigned of said first node.

In an embodiment, said method may comprise: assigning a sleep (idle) time slot to one or more nodes that are positioned in said grid within the transmission range of said first node and/or to one or more nodes that are positioned in said grid outside the transmission range of said first node, wherein said sleep time at least partially overlaps with said transmit slot assigned of said first node.

In an embodiment, said method may comprise: assigning sleep time idle slot to one or more nodes that are not (direct) neighbors of said first node.

In an embodiment said method may comprise: assigning one or more overlapping or coinciding transmit slots to said nodes wherein the distance between said transmitting nodes is larger than a predetermined minimum distance, preferably larger than a minimum number of hop distances.

In another embodiment, said method may comprise: a first node associated with a transmission slot retransmitting a first broadcast message that was transmitted in an earlier time slot to said a second node, wherein said first broadcast message is retransmitted by said first node if a first distance between said first node and a target node (data sink) in said network is smaller than a second distance between said second node and said target node (data sink)

The only information needed for the time slot allocation is the grid layout, the position of one other node in the network to fix the origin of the network, and the position of the node itself to calculate its position inside the network. In this manner a plurality of paths between any node and any destination can be instantiated, no routing is needed, all these paths are tried simultaneously, and collisions can be avoided. The method may be easily an order of magnitude more efficient than optimal ALOHA-like protocols, where transmit slot and receive slot are not specified. In contrast, during the transmit slot of a node the position-based time slot assignment allows assignment of idle slots to subsets of nodes that neighbor the transmitting node, thus limiting the amount of possible paths, limiting collisions, and limiting/prohibiting duplication of the message.

In an embodiment, said first broadcast message may comprise a message identifier for uniquely identifying said message; retransmission node identification information associated with said second node that retransmitted said message (the retransmitting node identifier); and/or, originating node identification information associated with the node which generated said message (the originating node identifier).

In an embodiment, said method may comprise: before retransmission of said first broadcast message by said first node, modifying said first broadcast message into a second (modified) broadcast message by inserting node identification information associated with said first node in said broadcast message.

In a further embodiment, said method may comprise: said second node receiving said broadcast message that was retransmitted by said first node; and, interpreting the reception of said broadcast message as an acknowledgement that said broadcast message was retransmitted to a node that is positioned closer to said target node than said second node.

In yet a further embodiment said time slot schedule may comprise a predetermined number of time slots, including at least one transmission time slot, a predetermined first number of reception time slots and a predetermined second number of sleep time slots, wherein said first and second number are selected such that during execution of said time slot schedule at least 50%, preferably 70%, more preferably 90% of said nodes are in the idle state.

For example, when using a conventional slotted Aloha protocol with random-based slot assignment, the optimal ratio between receive slots and transmit slots equals the number of nodes that are in range (1-hop neighbors). When for instance on average 25 nodes are within each other's transmission range, a frame of 25 slots would contain 1 transmit slot and 24 receive slots. In that case, the optimal probability that a given node receives the transmission from another given node (without collision, no other node in range transmits in the same time slot) approaches 1/e.

In contrast, when using the position-based broadcast protocol that allows both position-based transmit, receive and sleep slots, of the approximately 12 forwarding nodes 10 may be assigned to a sleep slot so that: 1) per transmission only two paths are used; 2) so that one node only has to listen to two upstream and two downstream nodes; 3) collisions are excluded; 4) alternative paths are used simultaneously; and, 5) the throughput is ⅕ instead of ½5e in the case of the slotted Aloha protocol (so at least 10 times higher). Further, the protocol does not need a location service or a route discovery or route maintenance service.

In an embodiment said time slot schedule may be determined by minimizing a cost function as defined by:

$$\sum_s P_s \sum_{i=1}^{K} \sum_{j=1}^{N} I_{[A_{ij}=s]}, \text{ for } s = T, L, S,$$

wherein the solution of the optimization procedure is a time slot allocation matrix A with dimension (K×N) where N is the total number of nodes and K is a number that exceeds the total number of time slots needed to receive all messages at the data sink, a row in said allocation matrix A corresponding to at least part of a time slot and a column in said allocation matrix corresponding may corresponding to a node identifier of a node in said network; and, wherein said cost function is minimized using one or more of the following constraints: equal power consumption for all nodes; minimum (average) power consumption; minimum delay time from data acquisition to the reception at a data sink; maximum data throughput over the mesh network; minimum collisions; time slot schedule comprising consecutive active slots and idle slots; the amount of idle slots; and/or the amount of nodes with an active receive slot in the neighborhood of a transmitting device. The class of solutions of such a minimization scheme yields the optimal possible TDMA schedule consistent with the applied constraints. Implementation of such solutions for the optimal TDMA schedule in the network is supported within the protocol.

In an embodiment said nodes may be static time-synchronized nodes. In an embodiment the length of said time slots may be of a predetermined fixed length. In a further embodiment, the length of said broadcast message may be fixed and selected such that a message can be transmitted and/or received within the duration of a time slot. Part of the invention relies on the fact that the nodes in the network are static (located at a substantially fixed position) and that the protocol supports broadcast of messages that are of a fixed length and that are self-contained: all information needed to identify the message; the node that transmits it; and, the message destination is included in the message. The full message fits in a single transmit or reception time slot, allowing for allocating fixed-length time slots (transmit slots, receive slots, and idle slots) to the nodes on the basis of their position in the mesh network.

In an embodiment, said method may further comprise: for one or more of said time slots assigning a broadcast transmission and reception frequency to at least part of said nodes in said network, wherein said frequency is selected on the basis of the position of said nodes in said network.

In another aspect, a wireless node for use in a wireless mesh network comprises a plurality of wireless nodes, preferably a grid layout determining the positions of said nodes in said network, wherein said node may comprise: a memory for storing position information associated with the nodes in said network, preferably said position information comprising said grid layout; a time slot scheduler configured for: determining or receiving at least part of a time slot schedule (frame), preferably a TDMA time slot schedule (frame), said time slot schedule comprising one or more time slots, including a transmission time slot enabling a node to transmit a broadcast message, a reception time slot enabling a node to receive a broadcast message from one or more other nodes; and, a sleep time slot for configuring said node in an idle state; and, assigning time slots of said time slot schedule to a node in said network on the basis of the position of said node in said network, preferably on the basis of said grid layout and the position of said node in said grid layout; and, optionally, for one or more of said time slots configuring said node for using a predetermined broadcast transmission and reception frequency, wherein said frequency is selected on the basis of the position of said node in said network, preferably on the basis of said grid layout and the position of said node in said grid layout.

In an embodiment, said wireless node may further comprise: a memory for storing a broadcast message in a message queue, said broadcast message being transmitted by a further node in an earlier time slot to said node; a communication module for retransmitting said broadcast message if a first distance between said node and a target node (data sink) in said network is smaller than a second distance between said further node and said target node (data sink).

In an embodiment, said broadcast message may comprise a message identifier for uniquely identifying said message; retransmission node identification information associated with said second node that retransmitted said message (the retransmitting node identifier); and/or, originating node identification information associated with the node which generated said message (the originating node identifier).

In yet a further aspect, a method for managing communication in a wireless mesh network comprises a plurality of wireless nodes, preferably a grid layout determining the positions of said nodes in said network, said method comprising: providing a time slot schedule (frame), preferably a TDMA time slot schedule (frame), said time slot schedule comprising one or more time slots, including a transmission time slot enabling a node to transmit a broadcast message, a reception time slot enabling a node to receive a broadcast message from one or more other nodes; and, a sleep time slot for configuring said node in an idle state; and, assigning a broadcast transmission frequency and message reception frequency to at least part of said nodes in said network, wherein said transmission and reception frequency are selected on the basis of the position of said nodes in said network.

A wireless node for use in a wireless mesh network comprises a plurality of wireless nodes, wherein said node is configured for executing any of the method steps as described above.

A computer program comprises software code portions configured for, when run in the memory of a computer, executing the method steps according to any of method claims above.

The invention will be further illustrated with reference to the attached drawings, which schematically will show embodiments. It will be understood that the invention is not in any way restricted to these specific embodiments.

BRIEF DESCRIPTION OF THE DRAWINGS

FIGS. 2A and 2B depicts examples of mathematical grids.

DETAILED DESCRIPTION

In this disclosure a broadcast protocol for mesh networks of wireless nodes is described wherein the (relative and/or absolute) positions of the nodes in the network are fixed and known to all, or at least a substantial part of the nodes in the mesh network. Here, a static network refers to a network wherein the position of a node may fixed in the sense that the coordinates of the nodes do not change on the level of the characteristic timescales of communication between the nodes (e.g. the length of a slotted (TDMA) time frame used by the nodes). The network layout of a static network may be changed or re-configured (e.g. by adding nodes to the network or removing nodes from the network), but during the operation of the network the nodes know the grid (the network topology) and their position inside the grid.

Figures 1A, 1B:
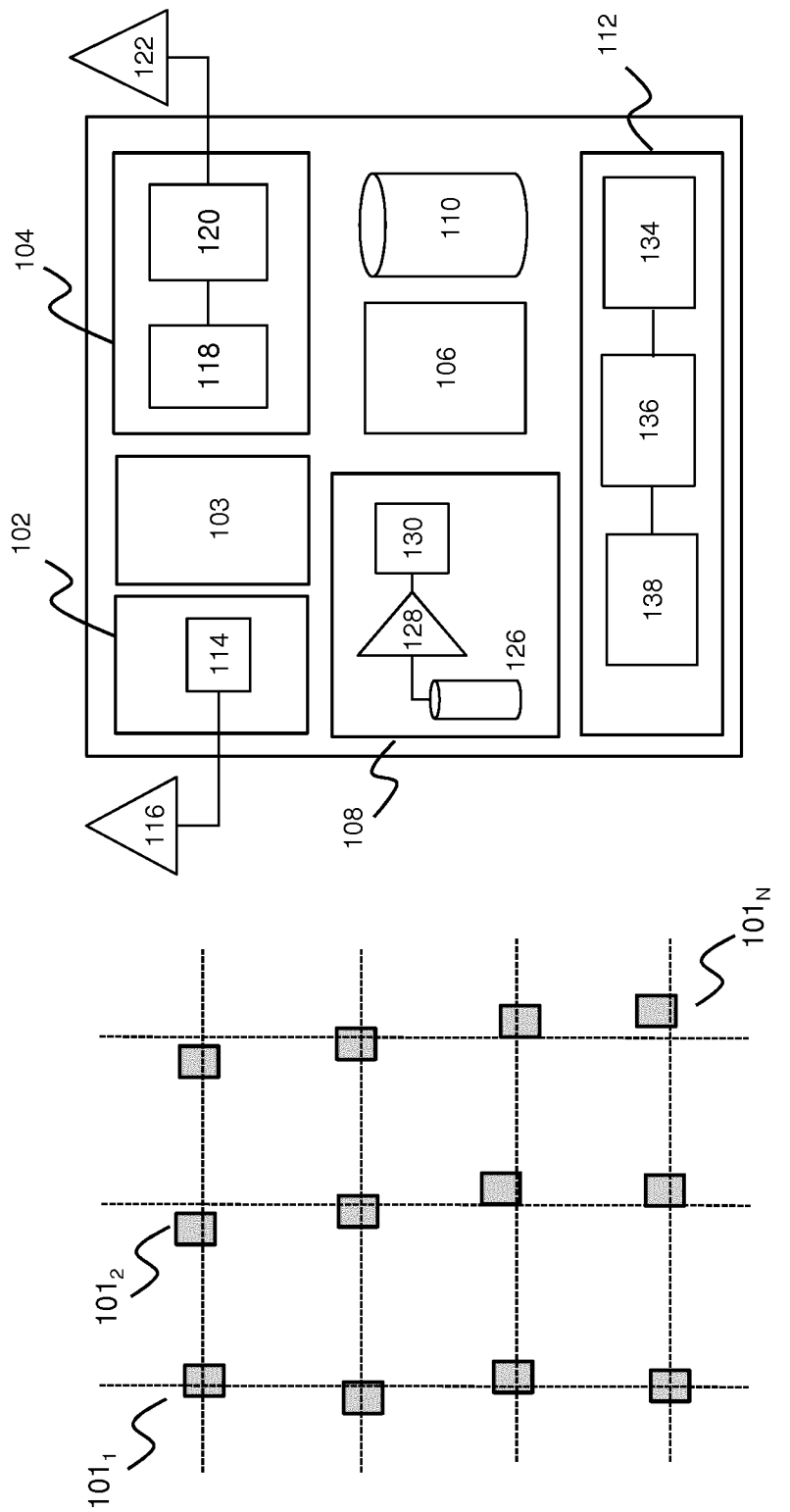
FIGS. 1A and 1B depict a schematic of part of a mesh network and a wireless node for use in such network respectively according to an embodiment of the invention.

FIGS. 1A and 1B depict a schematic of mesh network 100 and a wireless node 101 for use in such network respectively according to an embodiment of the invention. The mesh network may comprise a plurality of wireless nodes $101_{1-N}$ arranged in a random pattern or a regular pattern, wherein the nodes have fixed positions and wherein each node is positioned within transmission range of one or more nodes.

A node may comprise a number of modules that enable wireless communication between two or more nodes on the basis of a broadcast protocol. As shown in FIG. 1B, the modules in a node may include a positioning module, a timing module, a communication module, a central processor and a power management module. In an embodiment, the node may be configured as a sensor node comprising a sensor module for acquisition of sensor data.

The positioning module 102 may comprise a GPS receiver 114 connected to a GPS antenna 116 for receiving a GPS signal for providing information on the (absolute) position of the node. In an embodiment, the GPS signal may further comprise a time signal, e.g. the coordinated universal time (UTC time). The time signal may be provided to a timing module 103 that uses the time signal to synchronize a clock in the node. Alternatively, it may synchronize its clock on the basis of time information in the messages it receives from neighboring nodes as described e.g. in U.S. Pat. No. 8,149,733.

The communication module 104 may comprise an RF transceiver 118 and a radio module 120 connected to an antenna 122. The communication module may be operated in any suitable bandwidth, including the license free bands around 2.4 GHz. The communication module may be provided with a protocol stack, including a broadcast media access control (MAC) protocol that allows neighboring nodes in the mesh network to communicate with each other and to transfer information via multiple nodes from one point in the network to another point in the network. The information may be transmitted as payload in a message of a predetermined format (data structure).

The wireless node may further comprise a (low-power) microprocessor 106, e.g. a microcontroller or a field-programmable gate array (FPGA), for controlling the different modules in the node. Further, the microprocessor may be configured to execute one or more software programs for controlling processes in the sensor node and for controlling communication between the nodes. The software program may be stored in a memory 110 associated with the microprocessor. For example, it may execute a data acquisition program for controlling the sensor module and for generating sensor data. Moreover, it may execute a status program for generating status information of the node, e.g. energy level, processor load, sensor parameters, memory capacity, etc. The status information may be periodically generated and collected by transferring the status information of all nodes to a data collecting node (a data sink).

A slotted communication protocol such as the time-division medium access (TDMA) protocol may be used for efficient transfer of messages comprising sensor data and/or status information through the mesh network. To that end, a time-slot scheduler may be executed by the processor wherein the scheduler is configured to receive (or determine) a predetermined position-based time-slot schedule. In an embodiment, time slots may be organized in (TDMA) time frames and are processed by the scheduler in synchronization with the other nodes in the network. Time slots may have a predetermined certain duration. The scheduler may assign time slots to the node in order to configure it in a predetermined state including: a transmit (send) state, a reception state (listen) and a sleep state (idle). Time slots are assigned to the nodes depending on their position in the network.

Hence, when the time-slot schedule requires the node to be in the transmission state, the processor may instruct the communication module to activate the radio transmitter so that messages can be transmitted to other nodes in the mesh network. Similarly, when the time-slot schedule requires the sensor to be in a data reception state, the processor may instruct the communication module to activate the radio receiver in order to receive messages from another node in the mesh network. Transmitted and received messages may be stored on a message queue in the memory 110 of the node.

In an embodiment, the communication module may be configured to operate on one or more distinct frequency bands. In that case, the protocol may also support different frequency-distributed medium access (FDMA), in which the frequencies assigned for the communications to the nodes are based on the position of the nodes. For instance, a single large network may be split into one or more smaller sub-networks, wherein the nodes in the one or more sub-networks may use different frequency bands for the broadcast communication. In this manner, the nodes assigned to different sub-networks can transmit and receive without interfering with the operation of other sub networks.

Another example involves running different applications at the same time. For instance, when larger data blocks (e.g. containing new software image), that do not fit into a single transmit slot, need to be distributed, it may be advantageous to configure point-to-point transmissions between two neighboring nodes. In an embodiment, one or more point-to-point transmissions between neighboring nodes may take place during the time that the neighboring nodes have sleep (idle) slots as assigned in the TDMA schedule of the position-based broadcast protocol. These one or more point-to-point transmissions may take place one or more different frequency bands in order to avoid interference with the other nodes in the neighborhood of the network.

In an embodiment, the protocol supports the assignment of frequencies to nodes, based on their position, to perform such point-to-point transmissions as a second application running simultaneously with the broadcast transmission of messages. In an embodiment, the frequency-band assignment may be selected such that no nodes are transmitting at the same frequency at the same time within a configurable range (e.g. 5, 6, 7, . . . hops).

A node in the network may be identified by a unique node identifier. Further, a node is position-aware in the sense that it has knowledge of the layout of the network, including its own position and the position and node identifier of the other nodes in the mesh network. As will be described hereunder in more detail, the network layout may be stored or pre-configured in the memory 110 of the node. The processor may use the layout of the mesh network in order to calculate the distance relative to another node in the mesh network or to one or more data sinks in the mesh network.

In an embodiment, the time-slot scheduler may use the stored network layout in order to determine its own time slots and the time slots of other nodes in the network on the basis of the position of the node in the mesh network.

The sensor module 108 may comprise one or more sensors 126 including but not limited to switches, temperature sensors, voltage sensors, light sensors, humidity sensors, vibration sensors, accelerometers and/or gyros. These sensors may include micro electro-mechanical systems (MEMS) type devices such as accelerometers and gyros. The MEMS technology enables a range of low-power, miniaturized sensors. The sensor output may be connected to a signal processor 128 that may include a signal conditioner, amplifier and/or one or more filter stages and an analog-to-digital converter (ADC) 130 in order to transform the sensor signal into a digitized sensor signal that may be collected and processed by a dedicated microprocessor and stored into a data storage module 110 comprising e.g. flash memory and/or other data storage devices.

The wireless node may further comprise a power module 112 comprising a power source, e.g. one or more batteries 134, and a power controller 136. In an embodiment, the power module may further comprise one or more alternative power sources, e.g. a solar cell 138 or the like. The power controller may control the power mode of the different modules in the sensor node. For example, if the processor requires the sensor node to be in sleep state it may turn the modules off or set these modules in a low-power mode. Similarly, the memory module may be active during a data write cycle.

Some of the nodes in the mesh network may be configured to collect (part of) the (status) messages that are generated by wireless nodes (a data aggregation node or in short a data sink).

A plurality of wireless nodes as described in FIG. 1 may be arranged in a mesh network. The mesh network may comprise wireless nodes arranged in a random pattern or a regular pattern, wherein the nodes have fixed positions and wherein each node is positioned within reach of one or more neighboring nodes.

In case of a regular or (semi) regular pattern, the layout of the mesh described may be described as a mathematical grid layout. The grid may have one, two or three dimensions and may be described in terms of grid cells that may be repetitively tiled to span part of a space. A grid cell may comprise one or more nodes that are associated with a wireless node. Each grid cell may be associated with an index that is associated with a position of the cell in the grid. In an embodiment, the position of one or more nodes in a grid cell may be determined on the basis of a set of coordinates relative to the origin of a grid cell.

Further, each node inside the mathematical grid may be associated with a unique node identifier. The layout of the grid may be one-dimensional, wherein a grid cell may be described by grid cell line intervals; for a two-dimensional grid a grid cell may be described by grid cell areas; and, for a three-dimensional grid a grid cell may be described by grid cell volumes.

FIGS. 2A and 2B depict examples of mathematical grids that may be used to describe the positions of the wireless nodes in the mesh network. FIG. 2A depicts a one-dimensional mathematical grid 202 of N grid cells $204_{1-N}$ each comprising a grid cell line interval 205 of a predetermined length. A sensor node 206 may be positioned at the lower limit of the interval. The one-dimensional grid may be built by arranging grid cells in a one-dimensional array. An actual physical layout 208 of a (quasi) one-dimensional arrangement of wireless nodes $208_{1-4}$ may be mapped on the one-dimensional grid. In particular, each wireless node $208_{1-4}$ may be associated with a grid cell, a sensor node $210_{1-4}$ and a node identifier.

As shown in FIG. 2A, the actual positions (coordinates) of the wireless nodes may deviates slightly from the positions determined by the mathematical grid. It suffices that the position of each wireless node with respect to devices in directly neighboring cells is within half the minimum node distance as determined in the grid. On the basis of this scheme, a layout of wireless nodes in which the physical positions of the devices follow a curve with nodes positioned at roughly equal distances, may be simply mapped onto the one-dimensional grid. Only the relative distance between neighboring nodes is needed for this type of mapping (and not the absolute distance between the first and the last node).

FIG. 2B depicts an example of a two-dimensional mathematical grid 212 according to an embodiment of the invention. In principle, there are multiple variants to map regular grids using basic grid cells. For instance, a rectangular grid layout may be easily obtained using rectangular grid cells of predetermined dimensions comprising an integer number of nodes (1, 2, ..., N). The node positions in a grid cell may be chosen in several manners, leading to the same grid layout. In FIG. 2B an embodiment of a triangular grid layout is illustrated wherein the grid may be obtained using an N rectangular grid cells $214_{1-N}$. A triangular grid layout with nodes under relative angles of 60 degrees may be built by tiling an area with rectangular grid cells 214 wherein a grid cell comprises two sensor nodes $216_1$, $216_2$ wherein a first sensor node $216_1$ may be located at the origin of the grid cell and a second sensor node $216_2$ may be located in the center of the grid cell.

Networks of arbitrary size and arbitrary layout may be configured. Any regular layout may be described using a mathematical grid comprising triangular, hexagonal, rectangular, and kite-shaped grid cells thereby allowing simple implementation of any grid layout.

The mathematical grid may be used by the nodes for determining the positions of other nodes in the mesh network in a fast and efficient way. All or at least a substantial part of the nodes in the mesh network will be provided with a description of the grid layout, so that these devices are position-aware. In an embodiment, the description of the grid layout may be described in terms of grid cells, sensor nodes in the grid cells and node identifiers as described with reference to FIGS. 2A and 2B.

A node may be pre-configured with the (mathematical) grid layout (including the grid cell structure and the sensor positions in the grid cells). Alternatively, a sensor node may be provided with the grid layout through wireless communication between the sensor nodes. The node may determine its position using its position module and may associate (map) its position, e.g. GPS coordinates, with a cell and/or node in the mathematical grid wherein the node is identified by a node identifier. The sensor node may then further use the grid layout to determine the (relative and/or absolute) position of other sensor nodes that are associated with different node identifiers. This way the concept of a distance between different nodes in the mesh network may be introduced.

Hence, the wireless mesh network may comprise a network of wireless nodes wherein the positions of the nodes may be mapped onto a mathematical grid layout. A wireless node may be provided with the mathematical grid layout so that it is position-aware: the node is capable of mapping its physical position onto a node in the grid layout and it may determine the position of other wireless devices in the grid. In an embodiment, the wireless mesh network may comprise one or more data collectors or data sinks that may collect data that are acquired by wireless nodes. The position of the one or more data sinks (the sink position) and the position of the other nodes in the network are known to the nodes in the network.

As will be described hereunder in more detail, the position-awareness may be used by the broadcast protocol that is used by the nodes in order to transfer data to the data sink and/or to transfer instructions to one or more nodes in the mesh network.

Figure 3:
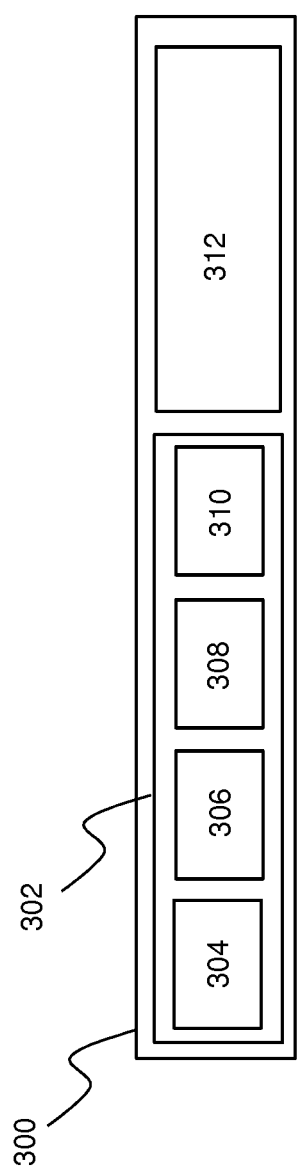
FIG. 3 depicts a broadcast message according to an embodiment of the invention.

The broadcast protocol relies on the use of self-contained, fixed-length messages of a predetermined format. FIG. 3 depicts a broadcast message according to an embodiment of the invention. A message 300 may comprise a header 302 and payload data 312. The payload data may comprise different type of data: sensor data, software instructions (e.g. a new software distribution image), node and/or sensor setting parameters, status information, etc. The header information may comprise: the node identifier of the node that retransmitted the message (the retransmitting node identifier) 304; the node identifier of the node from which the message originated (the originating node identifier) 306; a message identifier (e.g. a unique timestamp or a cyclic number) 308 and a message-type identifier (for distinguishing between different types of messages) 310. In some embodiments, part of the header information may be included in the payload data.

In a preferred embodiment, a message including the payload is of a fixed length wherein the length is selected such that it can be processed (transmitted or received) in a single time slot. Further, in an embodiment, the message may be self-contained, in the sense that it comprises all information needed to identify the message.

Figure 4B:
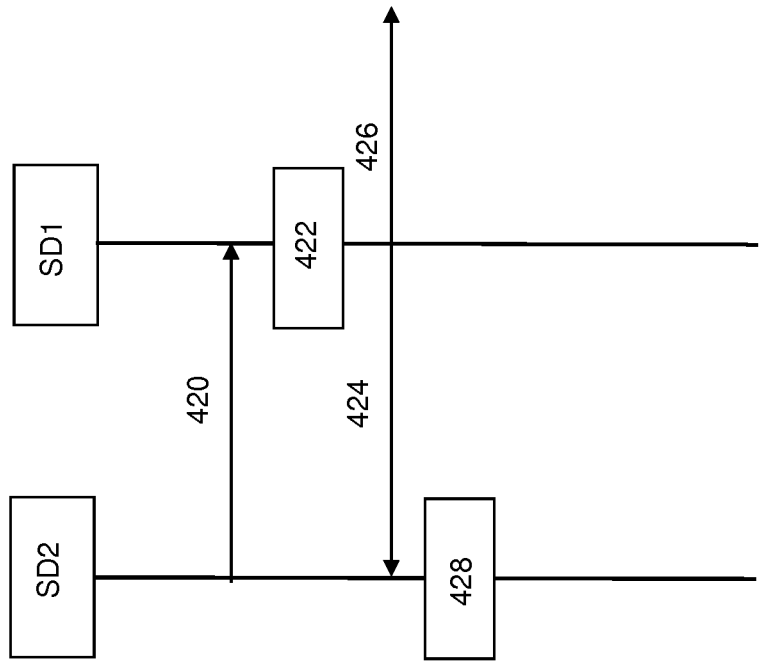
FIGS. 4A and 4B depict a schematic of part of a mesh network using a position-based time broadcast protocol and a flow diagram associated with such protocol according to an embodiment of the invention.
Figure 4A:
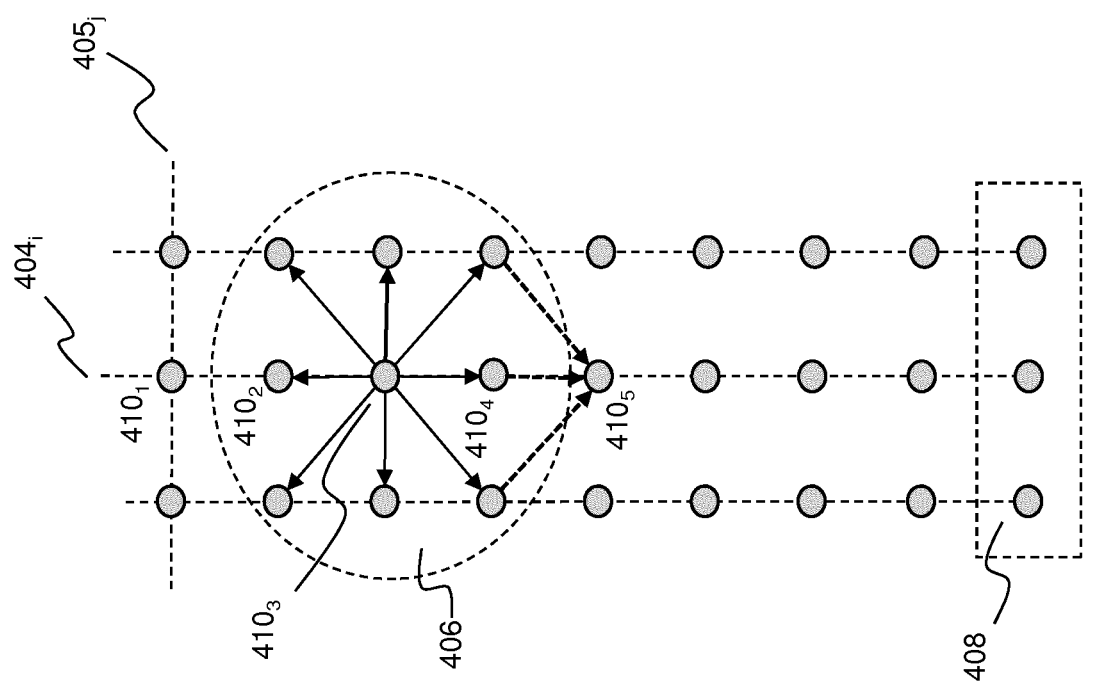

FIG. 4A depicts a schematic of part of a mesh network using a position-based broadcast protocol according to an embodiment of the invention. FIG. 4B depicts a flow diagram of two neighboring nodes, i.e. a transmitting node and an neighboring receiving node, in the mesh network of FIG. 4A. Time-synchronized nodes may be arranged in a number of i columns $404_i$ and j rows $405_j$ thereby forming an array of nodes. The distances between the nodes and the transmission range of the nodes may be selected such that at least nodes directly adjoining a transmitting node are within transmission range 406. In operation, instructions, status data and/or sensor data may be transported in messages via multiple nodes to a predetermined position in the mesh network. Status messages comprising status data of the sensor nodes may be transported via multiple sensor nodes to a data sink. In the embodiment of FIG. 4A, one or more nodes in the last (downstream) row may be configured as a data sink.

On the basis of the position of the nodes in the grid layout, slots of a predetermined length may be assigned to the nodes thereby configuring the nodes in a predetermined state of operation, e.g. a transmission state (black node), a receiving state (grey nodes) or an idle state (white nodes). In subsequent time slots the time-synchronized nodes may change from one state to another according to a predetermined schedule.

FIG. 4A depicts a network in operation wherein a first node (N1) $410_3$ is assigned to a transmit time slot so that it is configured in a transmit state. An earlier state of the first node may be associated with a received time slot in which it may have received a first broadcast message M1 from a second sensor node (N2) $410_2$ (step 420 in FIG. 4B). The payload of the first message may comprise status data of the second node or another node that is located further away from the data sink than the second node. Upon reception of the first message, the first sensor node may store the message in its message queue and use the information in the message (e.g. the retransmission node identifier) during the subsequent time slot (step 422 in FIG. 4B). For example, the first node in its transmission state may use the grid layout and the retransmission node identifier in the message in order to determine whether it is located closer to the data sink than the second node or whether it is located further away.

If the distance between the first node and the data sink is larger than the distance between second node and the data sink, the first node may decide that further propagation of the first message is not desirable. In that case, it may decide not to retransmit (broadcast) the message. If the distance is smaller, the first device may decide that further propagation of the message is desired. In that case, it may decide to broadcast the first message to its neighboring nodes that are in the receive state (schematically depicted by steps 424, 426 in FIG. 4B). It is submitted that unless expressively defined otherwise, the term "neighboring nodes" refers to nodes in terms of the mathematical grid, i.e. nodes positioned on the grid that are within the transmission range of a transmitting node and that are in the receiving (listening) state.

In an embodiment, upon retransmission, the first node may modify the first message by replacing or changing the retransmission node identifier. For example, it may replace the retransmission node identifier of the second node with its own retransmission node identifier before broadcasting the modified message as a second message to the neighboring nodes that are (illustrated in FIG. 4A by the arrows) of which at least some are in the receiving state.

After (re)transmission of the first broadcast message, a receive time slot may be assigned to the second node thereby switching from a transmission state to a reception state so that it is able to receive broadcast messages. This way, the second node is configured to receive the second message that was broadcasted by the first node (step 424 in FIG. 4B). When it receives the second message, the second node may use the identifiers in the message and the grid layout in order to determine that the first broadcast message was successfully received (step 428 in FIG. 4B) and retransmitted by the first node (step 426 in FIG. 4B). Hence, the second node may interpret the reception of the second message as an acknowledgement that the message was successfully received and retransmitted by a sensor node (in this case the first sensor node) that is located closer to the data sink than itself. The above scheme may be executed repetitively for each or at least a substantial part of all nodes in the network in order to transfer messages to the data sink.

Hence, from the above, it follows that the position-based broadcast protocol uses the position-awareness of the nodes in the network. The broadcast messages may contain a node identifier indicating a position of a node in a grid layout. The node identifier (and its position) may be interpreted by individual nodes and actions may be taken accordingly (e.g. a node may decide to ignore or to retransmit the message based on the identifiers and its own position in the network, to produce new data itself, or to control/actuate a sensor).

The protocol uses the position information on nodes in the mesh network in order to decide to retransmit a message to a node that is closer to a data sink. A single broadcast transmission may be received by multiple neighboring nodes so that the information is spread quickly along multiple paths, whereas a retransmitted message may simultaneously serve as an acknowledgement to all nodes that already received the message before.

The protocol allows transport of data via multiple paths through the mesh network so that it is fault tolerant and there is no single point of failure. Malfunctioning of individual nodes does not hamper the data flow through the remainder of the network. The use of broadcast communication is especially suitable when complete instructions or status reports fit in a single message of a length that can be transmitted in a single time slot. In that case, the message can be retransmitted without compromising the data integrity: the message is self-contained.

Further, the protocol avoids the need of configuring and implementing routing tables. The network may be extended with additional nodes, or one or more nodes may be replaced (hot-swap) without the need to reconfigure the network: when added to the network, a sensor node uses the network grid layout in order to map itself on network node that is associated with a predetermined node identifier and thereafter is fully knowledgeable about its neighboring nodes.

As described above, in an embodiment, the nodes may be operated in different states: the transmission, reception (listening) and idle (sleep) state. When messages are transported though the mesh network, the node may switch from one mode to the other depending on the particular situation. In particular, a node may be in a reception state when one of its neighboring nodes is in a transmitting state; in a transmitting state when (at least some) neighboring nodes are in a receiving state; and in an idle state when the neighbors in the vicinity of the node are idle as well.

In an embodiment, a node may be configured to determine its own time slot schedule on the basis of the transmission length, grid layout and position. Alternatively, the time slot schedules can be provided to each node via broadcast instructions or software updates.

In an embodiment, the broadcast protocol may be advantageously implemented on the basis of a TDMA schedule. Preferably, a large part of the sensing devices may be idle for a large fraction of the time. As will be described below, such TDMA schedule may be configured for optimal data throughput within the mesh network, minimal collision rate, and/or low radio-power consumption. In this protocol, the assignment of transmit slots and receive slots is based on the position of the nodes, and on time synchronization throughout the network.

Figure 5:
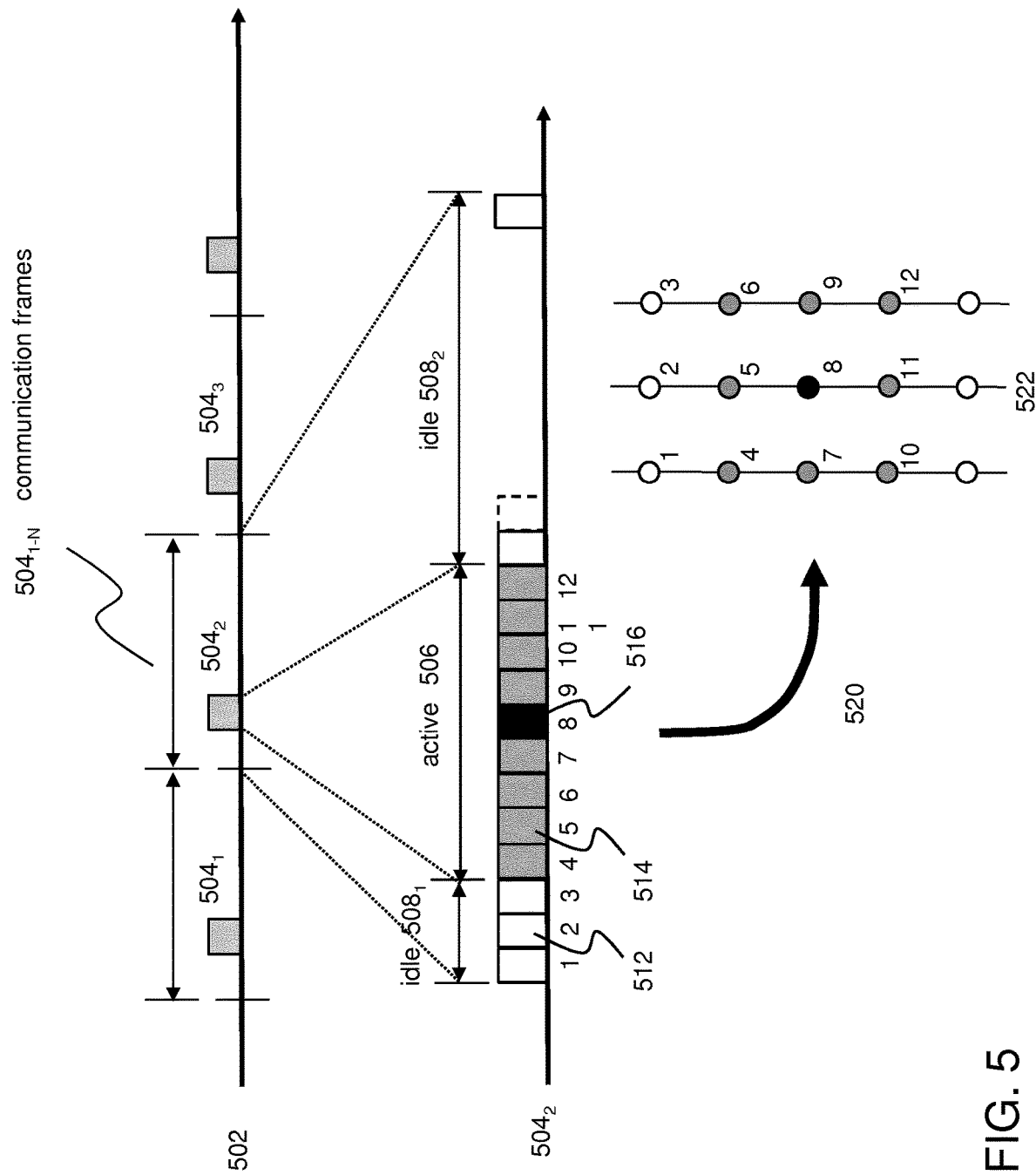
FIG. 5 depicts a schematic of a position-based time-slot schedule according to an embodiment of the invention.

FIG. 5 depicts a schematic of a position-based time-slot schedule according to an embodiment of the invention. The position-based schedule determines the state of a node at different points in time. FIG. 5 depicts a time basis 502 of the synchronized clocks of the nodes in the mesh network. The time may be divided in time (communication) frames $504_{1-N}$ of a predetermined length. In an embodiment, a time frame $504_2$ may comprise one or more active time slots 506 and one or more idle time slots $508_{1,2}$.

The active time slots may be used to configure nodes to receive messages or to transmit messages. Hence, the active time slots may comprise one or more transmission slots 516 and one or more reception time slots 514. During the idle time slots a node may turn off modules that are not required for transmission or reception so that power consumption can be minimized. The communication frames may be synchronized in time throughout the network using a synchronized clock in each of the nodes.

The assignment 512 of active and passive slots may depend on the position of the node in the mesh network. As shown in FIG. 5, the idle time slots 1-3 and the active time slots 4-12 may be assigned on the basis of the position of the nodes in the network. For example, the receiving time slots 4-7 and 9-12 may be assigned to nodes that directly neighbors the node to which the transmission time slot 8 is assigned. In this manner, the transmission can be received by several one-hop neighbors simultaneously, enlarging the chance that a forward path towards the data sink is found (several forward neighbors can receive the transmission) and limiting data duplication (the transmission can serve as an acknowledgement that the data have been sent for one-hop neighbors at larger distance to the data sink).

In an embodiment, the grid layout that is known to the nodes may be used to generate a TDMA schedule for reading out the mesh network. As will be described hereunder in more detail, TDMA time slots may be assigned to the nodes in the mesh network wherein the slot assignment is optimized for one or more characteristic parameters of the mesh network and/or nodes such as power consumption, data collision, etc.

In an embodiment, a (light-weight) TDMA schedule may be used wherein a nodes may be assigned one transmit slot per frame; and, nodes may be assigned receive slots that coincide with the transmit slots of one or more nodes in the direct neighborhood (one hop distance) of the node to which a transmit slot is assigned.

In an embodiment, transmit slots in the TDMA schedule may be optimized to rapidly transfer information in the direction of one or more data sinks: upstream nodes may have transmit slots assigned that directly precede the transmit slot of a one-hop downstream neighbor, so that a message can be transported over many hops in a single time frame. In this manner the data transportation speed towards the data aggregation center may be optimized and the length of the idle periods may be maximized.

In another embodiment, the TDMA schedule may be configured for avoiding collisions by using a slot assignment schedule wherein a first receiving node associated with an receive slot, has a second node in its (direct) neighborhood (one hop distance) that is associated with a transmission slot. Further nodes in the network that are associated with a transmit slot are required to have a configurable minimum distance to the first receiving node (e.g. be 5 hops away or more).

After determination of the TDMA schedule, the time slots may be assigned to the sensor nodes in the mesh network. Slot assignment may be realized at start up by transmitting the slots to the different sensor nodes. Further, an active network may be extended with new devices without interrupting the ongoing communication: a new node may be placed at a previously unoccupied node position and may join the network after an initialization phase. Similarly, a node may be "hot-swapped", i.e. a device may be replaced where after the newly placed device may use the grid layout to discover its node identifier and assume the role of the replaced node inside the network.

The nodes need to be synchronized in time in order to calculate the beginning and end of the transmit slots and receive slots. Time synchronization may be achieved either by the presence of an accurate on-board clock or by synchronizing to neighboring nodes that have precise time knowledge. In an embodiment, a GPS module may be used to synchronize the clocks of the module to a small fraction of the width of a single time slot.

In an embodiment, if no GPS time stamps are available for a node, it may keep its clock synchronized by listening to the broadcast messages of its neighbors. Here, the start of the transmission inside a transmit slot occurs at a well-defined moment in the time frame. Further, the node identifier of a transmit slot is part of the message. This information may be used by a receiving node to accurately calculate the start of the frame when a broadcast message is received (within a small fraction of a single time slot).

The above-defined TDMA schedule may guarantee: no collisions due to nodes within a configurable range; multiple routes between nodes for fault-tolerance (which is configurable, depending on cell structure); equal power consumption: all nodes have same number of transmit slots, receive slots, and idle slots per frame; configurable idle time (typically 90 percent idle time may be used but this may be raised arbitrarily); high data throughput (the transmit slot assignment may be chosen such that messages can be transported over a large number of hops during a single time frame); low power consumption; if a receive slot is active, there is a node in the direct neighborhood transmitting possibly interesting data; transmission ranges are limited to neighboring cells, requiring limited broadcast power.

The default light-weight position-based TDMA schedule is close to optimal. If different constraints are placed, another more optimal solution can be found. For example, if fault-tolerance is totally unimportant, nodes just have to listen to one device further on the grid. Nodes do not need to listen for an acknowledgement and just transport their messages and the messages of one other node. Then, a node needs only one transmit slot and one receive slot per frame. This scenario lowers power consumption to the absolute minimum (assuming multiple hops are needed to read out the full network), but eliminates the possibility to distribute instructions throughout the grid and does not guarantee that a data package is delivered.

To illustrate the workings of the protocol, we discuss a realization for a basic 3×N rectangular grid of identical sensors. Such networks may be used in the field of oil and gas exploration, where the sensors typically are geophones. In the example, data from the network may be collected by a data aggregation node.

Figure 6:
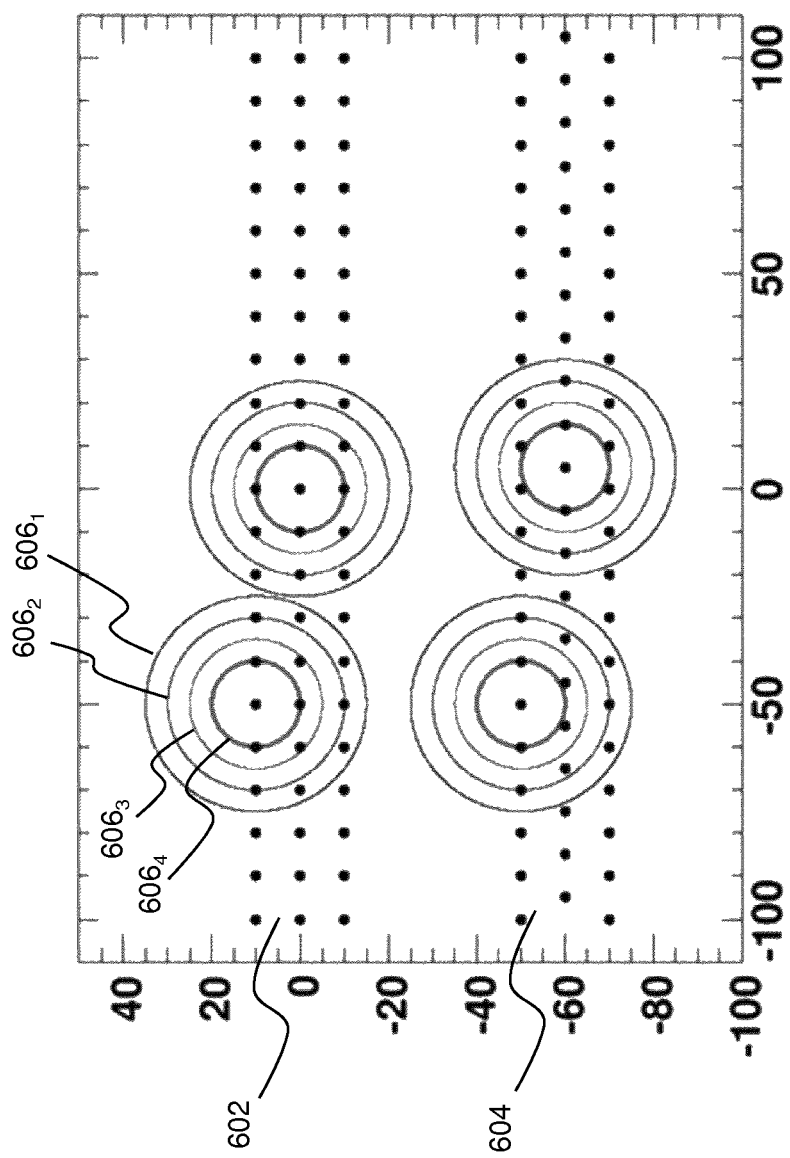
FIG. 6 depicts various network topologies that may use a position-based broadcast protocol according to an embodiment of the invention.

A schematic representation of two possible topologies is illustrated in FIG. 6. The grid comprises a 3×N grid of nodes (an array of 3 rows and N columns (of which 21 are shown). In the upper topology 602, the grid cell shape is square, so that the distance unit between a node and its closest neighbors is the same in the horizontal and vertical direction. In the lower topology 604, the grid cell shape is triangular. The simulations described hereunder are based on the square grid cell layout wherein the data aggregation node is located at position (−110, 0). The circles $606_{1-4}$ indicate different possible transmission ranges, i.e. 10, 15, 20 and 25 distance units. In the simulations a 25-unit transmission range is employed.

In this embodiment, each node may be configured to listen to the neighbors in rows its own column, the nodes in the upstream column (one column to the right), and the downstream column (one column to the left) comparable to the schematic of FIG. 4A. For these 8 close-by neighbors, the probability that they can correctly receive a transmitted message is high. In this networking scheme, all nodes and all links are doubly protected against failure. In each column, two nodes may fail and the third node still can retransmit the data of any node in the previous column (hence the network operation is not interrupted).

Figures 7A, 7B:
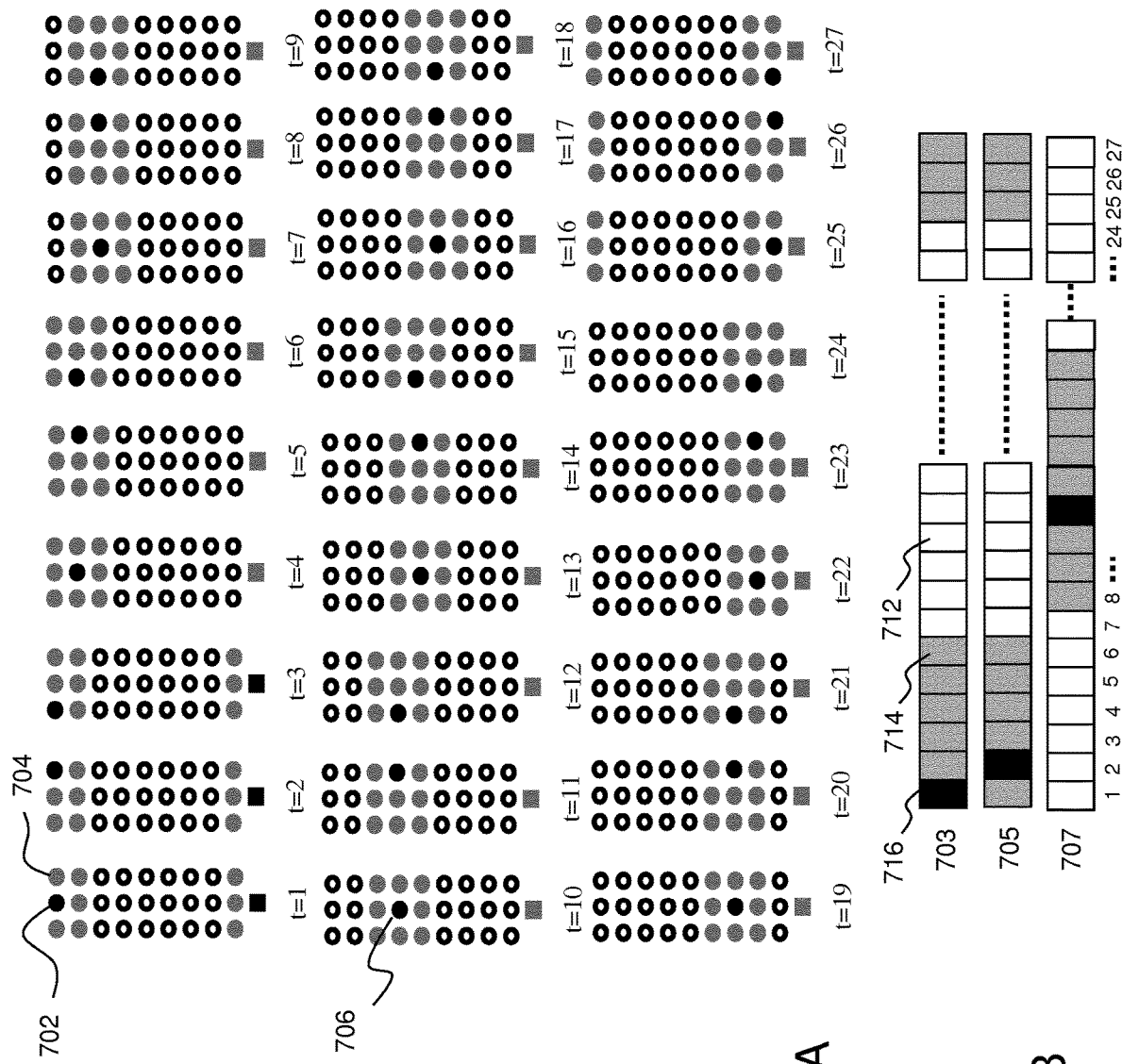
FIG. 7 depicts the execution of a position-based time slot schedule according to an embodiment of the invention.

FIGS. 7A and 7B depicts the execution of a position-based time slot schedule according to an embodiment of the invention. In particular, FIG. 7B depicts the activity for consecutive time slots of the data sink and part of the nodes in the mesh network that are close to the data sink (in the example of FIG. 7: 27 nodes in a rectangular mesh network for 27 consecutive slots). The data sink is indicated as a square and is located at the bottom. The nodes are indicated with circles. Black, grey, and white circles indicate whether a node is transmitting, receiving, or idle during the time slot. In this example, the time frame may comprise 27 time slots. Hence, after 27 slots the frame is repeated. In this particular embodiment, all nodes have equal power consumption: all nodes are active for 9 consecutive slots (1 transmit slot and 8 receive slot) and are idle for 18 consecutive slots.

In the embodiment of FIG. 7A, per frame each node may be assigned 1 transmit slot and 8 receive slots (which coincide with the transmit slot of the other nodes in its row or the closest neighboring rows). The last three transmit slots in the frame are assigned to the nodes in the row closest to the data sink. The three transmit slots before these slots are assigned to the next row, etc. Such assignment of slots may result in very short time delays: in 300 slots a message may be transported over 100 hops in the direction of the data sink.

In an embodiment, a frame length of 27 may be selected. FIG. 7B depicts three different frames of 27 time slots associated with different node nodes in the mesh network. For example, a first frame 703 is associated with a first node 702 in the network. This node is in a transmitting state for the first time slot, in a receiving state for time slots 2-6 and 25-27 and in a sleep state for time slots 7-24. The second frame 705 is associated with a second node 704 which is the one-hop neighbor of node 702. The frame associated with this node is almost the same as the frame of node 702 with the exception that this node is in a receiving state at the first time slot and in a transmitting state at the second time slot. The third frame is associated with a third node 706 that is located downstream, i.e. three rows below the first node.

In that case nodes may be idle for ⅔ of the time. For this grid configuration and time slot allocation, the minimal distance between 2 transmitting nodes would equal 9 rows, so that the possibility of collisions is strongly reduced. For larger percentages of idle time, the distance between transmitting nodes would increase. For example for a frame length of 180 slots (which would result in 95% idle time), the minimal distance between transmitting nodes would be 60 rows.

Hence, in the above time slot schedule active periods of the time frames overlap at least partly with the active periods of the time frames of neighboring nodes, allowing for communication throughout the full network. The active transmit slots and receive slots of two nodes that are not direct neighbors (multi-hop nodes) in the network may be disjunct. In this manner, the data collision rate may be substantially reduced.

In an implementation of the protocol, multiple messages, e.g. 9 messages, may be transmitted in a single transmit slot. In that case, all 27 nodes may be read out in a single frame (of 27 slots). The possibility to fit more packages inside one transmit slot is not a necessary element in calculating the slot configuration. If an implementation is desired that is based on the protocol in which only one single message can be transmitted per time slot, it would take a minimum of 9 frames to read out 27 nodes in the example shown in FIG. 7A.

Figure 8A:
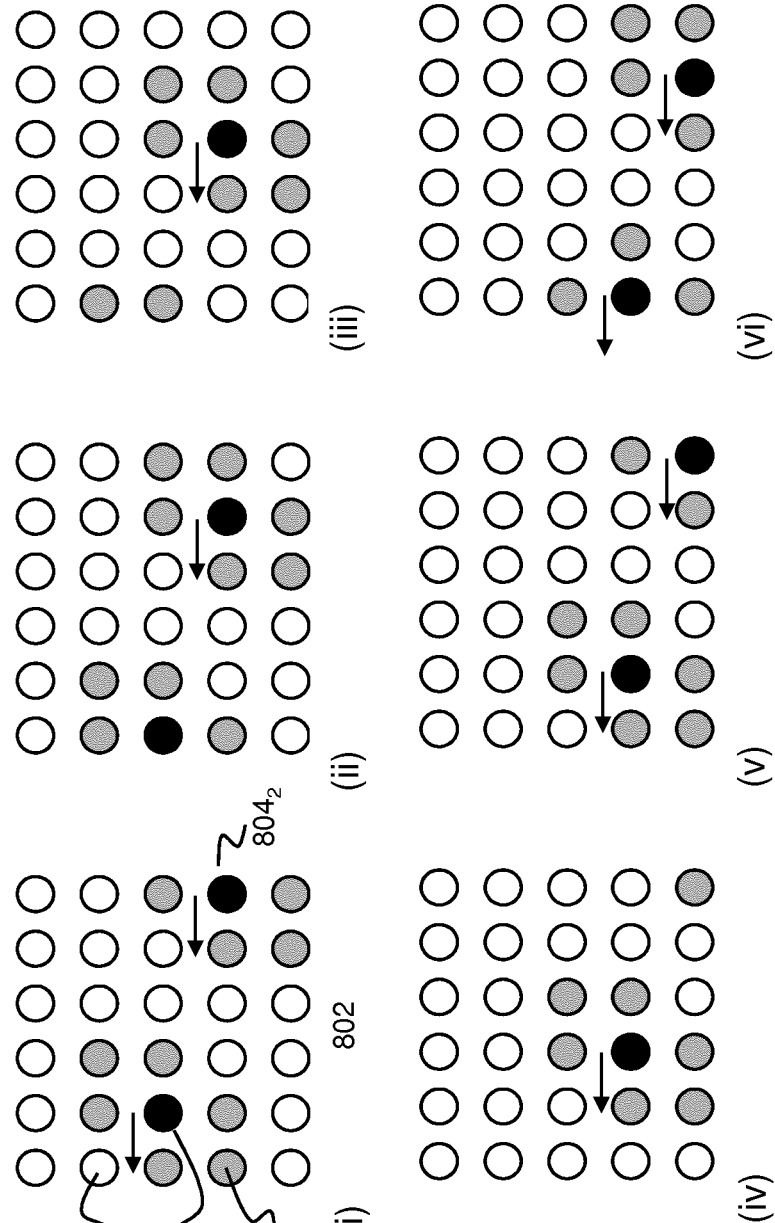
FIGS. 8A and 8B depict the execution of a position-based time slot schedule according to another embodiment of the invention.
Figure 8B:
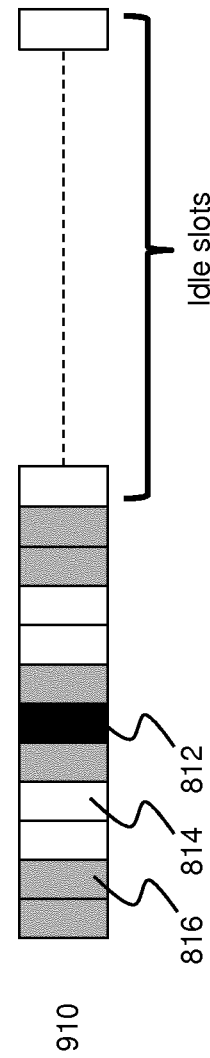

FIGS. 8A and 8B depict the execution of a position-based time slot schedule according to another embodiment of the invention. FIG. 8A depicts the status of a network 802 with a square layout (30 nodes shown) for six consecutive time slots (i)-(vi). The minimum distance of nodes with a transmit slot that may cause a collision is selected to be 3 row distances and the maximum distance of nodes of which the transmission needs to be received may be $\sqrt{2}$ row distance. FIG. 8B depicts a time frame 810 which may comprise 140 slots (of which 95% are idle slots). For example, in this frame, the nodes may have 6 active receive slots 816, one active transmit slot 812 and the remaining 133 slots may be idle slots. Each slot is represented as a rectangle (grey is a receive slot, black the transmit slot, white are the idle slots). In this scheme there is a group of 129 consecutive idle slots. The information of both transmitting nodes $804_{1,2}$ in slot 1 may be received by the data sink in the lower left corner at timeslot 5. A given message can be transported over 140 hops in a single time frame.

In a further embodiment, an optimized position-based time slot schedule for a given layout of a mesh network may be obtained. To that end, the position-based broadcast protocol supports a mathematically optimal solution for the position-based time slot schedule (such as a TDMA time schedule). Embodiment thereof will be described hereunder in more detail.

The mesh network may comprise of a number N of identical nodes and M special nodes called data sinks. Each node is defined by a unique node-ID in the range 1, 2, . . . , N, while data sinks are labeled −1, −2, . . . , −M. The set of nodes is represented by the symbol N. Time is divided in slots of duration $t_{SL}$. A fixed number $n_{TS}$ of time slots is combined into a time frame. To each node, time slots in the time frame are assigned in which the node may transmit (send), receive (listen) or sleep (idle). The time slot assigned is based on the position of the node in the network. The set of time slots is represented by the symbol T.

Every node i in the network may be required to broadcast status messages at a given time interval $t_{BM}$. Each message fits in a single time slot, and it may be possible to fit multiple messages in a single time slot. A broadcast message may have a data format as described with reference to FIG. 3 and may comprise information on: the node-ID that transmits the message (MTID); the node-ID of the node from which the message originated (MOID); a unique message identifier (MUID); and, payload data. Payload data may contain a message type ID (to distinguish between different types of messages); status information and/or sensor data.

The messages may be transmitted by nodes using broadcasting. A node i that receives a message is in state $L_{kj}$, where k is the node-ID of the node that last transmitted the message and j=MOID. Similarly, node i that is transmitting a message, is in state $T_{ij}$, where the MTID has been updated to the node-ID node of node i and j=MOID. In case MTID and MOID are not relevant for the discussion, the state notation is abbreviated to L≡L and T≡T. In the same spirit $L_{*j}$ implies that the node receives a status message that originated from node j, but where it is irrelevant which node transmitted this message.

At any point in time, each node is in a specific state, labeled s. States may be defined, including: s=$L_{ij}$ listen (receive); s=$T_{ij}$ transmit (send); and, s=S sleep (idle). The power consumption of each node is determined by its state and is denoted as $P_T$, $P_L$ and $P_S$ for transmit, receive and sleep state, respectively.

In an embodiment, the protocol may enable forwarding of messages that are generated by the nodes in the network and collection of the messages at the data sinks. A node knows (at least part) of the topology T (grid layout) of the mesh network. In some embodiments, the topology may comprise a regular repetitive structure of grid cells. Nodes are aware of the position of data sinks and know the mapping of node-IDs to the arrangement of nodes in the mesh network. Furthermore, nodes have the means to determine their position in the grid topology and its node identifier.

Within the mesh network, the concept of distance may be introduced. To that end, positive real function D(i,j)—a distance function—may be introduced representing the distance between a first node i with node identifier $ID_i$ and second node j with node identifier $ID_j$. Here, the distance function may depend on the topology of the network. Here D(−1,k) may define a sink distance determining the distance between the sink with node identifier $ID_{-1}$ and a sensor node with node identifier $ID_k$. Further, a (Boolean) function $R_{jkl}$ may be defined wherein $R_{jkl}$ may be set to a first value (e.g. 1) in case the distance D(l,k) between the sink l and node k is equal or smaller than D(l,j), thus: if D(l, k)≤D(l, j) then $R_{jkl}$=1; otherwise, $R_{jkl}$ may be set to a second value (e.g. 0). The distance function may be used to enable directional data communication in the mesh network and/or to determine an optimized TDMA schedule for data communication in the mesh network.

Nodes in the mesh network may use a broadcasting technique to transmit messages. When a node transmits a message, the message may be received by neighboring nodes that are positioned within the transmission range of the transmitting node and that are in the receive state. The receiving node may use the distance function D in order to determine its distance with respect to the sink. When the receiving node is closer to the data sink than the node that previously transmitted the message in the direction of the data sink, it may retransmit the message by broadcasting.

Subsequently messages may be forwarded in the direction of the data sink by nodes that are closer to the data sink than the node that previously transmitted the message. To accomplish this, each node must keep track of messages in a local message queue. The message queue of node i is denoted $Q_i$. Messages must be put on the queue of node i in case this node overhears the broadcast of a message by a node k that is at a greater distance (than node i) from the data sink l. Node i is thus in state $L_{kj}$, and $R_{ikl}$=0. Messages may be cleared from the queue of node i in case this node overhears the broadcast of a message present in its queue by a node k that is closer to the data sink l. In this case that node i is in state $L_{kj}$ and $R_{ikl}$=1

Each node may be associated with a transmission range over which it may communicate with other nodes. A range matrix C with dimension (N×N) may be defined wherein an element in the range matrix may be set to a predetermined first value, e.g. C(i, j)=1, when node i is able to successfully transmit messages to and receive messages from node j. In case node j is not within the range of node i, it may be set to a second value, e.g. C(i,j)=0.

A solution of the optimization procedure is the (time slot) allocation matrix A with dimension (K×N) where N is the total number of nodes and K is a number that exceeds the total number of time slots needed to receive all messages at the data sinks. A row in the allocation matrix A may corresponds to at least part of a time slot, while a column may correspond to a certain node identifier. In an embodiment, an element A(i,j) of the allocation matrix may be either a transmission state $T_{jl}$, a reception state $L_{kl}$ or a sleeping state S, where l is the node-ID of the node from where the message originated.

In order to determine an optimal TDMA schedule for a given network layout T, a cost function may be defined that will depend on the topology T and on the amount of messages that may be transmitted and acknowledged per time slot. The optimization may be subject to various criteria, including but not limited to:

Equal power consumption for all nodes;
Minimum (average) power consumption;
Minimum delay time from data acquisition to the reception at a data sink;
Maximum data throughput over the mesh network;
Minimum collisions;
Time slot schedule comprising consecutive active slots and idle slots;
Amount of idle slots (typically 90 percent may be selected);
Degree of fault-tolerance—the amount of devices with an active receive slot in the neighborhood of a transmitting device.

Depending on the weight of one or more of these constraints, the result A of the minimization of the cost function will be different.

As an example, a mesh network comprising N nodes and a single data aggregation center with node number −1 may be considered. In this example, every node may send a single (status) message per time slot. The network has to deliver these messages to the data aggregation center. The optimal protocol is the protocol that minimizes power consumption while guaranteeing $$\sum_s P_s \sum_{i=1}^{K} \sum_{j=1}^{N} I_{[A_{ij}=s]}, \text{ for } s = T, L, S,$$

full message delivery at the data sink. This condition may be formulated as minimize:
Subject to the following constraints:

$$\forall j \in \mathbb{N}: \Sigma_{i=1}^{K} I_{[A_{ij}=T*_j]} \geq 1; \quad (1)$$

$$\forall j \in \mathbb{N}, (\exists i \in \mathbb{T}) \wedge (\exists k \in \mathbb{N}): I_{[A_{ij}=L]}(I_{[A_{ik}=(T_{k*} \in Q_j)]} \\ \wedge C(j,k) \wedge R_{jkl})(\Sigma_m(I_{[A_{im}=T]}) \wedge C(j,m))=1; \quad (2)$$

$$\forall j \in \mathbb{N}, (\exists i \in \mathbb{T}) \wedge (\exists k \in \mathbb{N}): I_{[A_{ij}=L]}(I_{[A_{ik}=T_{k*}]} \wedge C(j,k) \\ \wedge R_{kjl})(\Sigma_m(I_{[A_{im}=T]}) \wedge C(j,m))=1, \quad (3)$$

⇒ If for time slot q>i, $T_{k*} \notin Q_j$, then do nothing (constraint 2 active), else $$I_{[A_{(q>i)k*}=L]}(I_{[A_{(q>i)j}=T_{j*}=Q_j[T_{k*}]]} \wedge C(j,k) \wedge R_{kjl}) \\ (\Sigma_m(I_{[A_{qm}=T]}) \wedge C(j,m))=1;$$

$$\forall j \in \mathbb{N}: \Sigma_{i=1}^{K} I_{[A_{i,-1}=L*_j]} \geq 1. \quad (4)$$

Hereunder, a brief description of the equations is given. The total power P is given by the sum over the power of $$\sum_s P_s \sum_{i=1}^{K} \sum_{j=1}^{N} I_{[A_{ij}=s]}, \text{ for } s = T, L, S,$$

all individual nodes:
taking their states at each time slot into account, and summing over all time slots. Here $I_{[Aij=S]}=1$ in case node j in time slot i is in state S (sleep or idle), and $I_{[Aij=S]}=0$ otherwise. Similar conditions hold for states T and L.

The first constraint is associated with the generation of (status) messages and determines that every node j has sent its own status data message $T_{jj}$ at least once:

$$\forall j \in \mathbb{N}: \sum_{i=1}^{K} I_{[A_{ij}=T_{jj}]} \geq 1.$$

This ensures that all data messages will be sent, since otherwise the optimal solution would be a network with all nodes in state S in all time slots (assuming the idle state corresponds to lowest power consumption).

The second constraint is associated with receiving message-transmit acknowledgements and determines that for every node j, there is a time slot i, where node j has received acknowledgement by a node k of the data transfer of one of its previously send messages $T_* \in Q_j$ (e.g. a message sent previously by node j). Node k should be in range of node j (C(j,k)=1) and closer to the data sink ($R_{jkl}=1$):

$$\forall j \in \mathbb{N}, (\exists i \in \mathbb{T}) \wedge (\exists k \in \mathbb{N}): I_{[A_{ij}=L]} \\ (I_{[A_{ik}=(T_{k*} \in Q_j)]} \wedge C(j,k) \wedge R_{jkl})(\Sigma_m(I_{[A_{im}=T]}) \wedge \\ C(j,m))=1.$$

When this acknowledgement has been received, node j can clear this message from its message queue. Note that in this example, the data sink is labeled as node l=−1, and that k may equal l (i.e., the data sink may send confirmation).

Furthermore, it is required that no other node(s) m in the range of node j is sending a message in the same time slot i (since this would lead to collisions and data loss). This may be accomplished with the last factor in brackets in the above equation. Without this constraint, nodes would just broadcast their status message only once in the expectation that this message would be routed to the data sink without data loss. Consequently, this rule is implemented to improve fault tolerance of the protocol.

The third constraint is associated with the generation of message-transmit acknowledgements and determines that if a message is received in time slot i by node j from a node k (and thus C(j,k)=1) that is located at greater distance from the data sink (thus $R_{kjl}=1$), then this message is acknowledged at a later time (q>i). To accomplish this, the message may be put on the message queue of node j as entry $Q_j[T_{k*}]$.

Concerning the acknowledgement, two things may happen:
The message can be acknowledged by a different node k≠j that is closer to the data sink than node j. This is essentially what happens under constraint 2 above: node j flushes entry $Q_j[T_{k*}]$ from its message queue and no further action is required.
Node j actively acknowledges message $T_{k*}$ at a later time q>i.

Mathematically, this third constrained can be expressed as:

$$\forall j \in \mathbb{N}, (\exists i \in \mathbb{T}) \wedge (\exists k \in \mathbb{N}): I_{[A_{ij}=L]}(I_{[A_{ik}=T_{k*}]} \wedge \\ C(j,k) \wedge R_{kjl})(\Sigma_m(I_{[A_{im}=T]}) \wedge C(j,m))=1,$$

⇒ If for time slot q>i, $T_{k*} \notin Q_j$, then do nothing (constraint 2 active), else $I_{[A_{(q>i)k*}=L]}(I_{[A_{(q>i)j}=T_{j*}=Q_j[T_{k*}]]} \wedge C(j,k) \wedge R_{kjl}) \\ (\Sigma_m(I_{[A_{qm}=T]}) \wedge C(j,m))=1.$ After this acknowledgement, node j may clear this message from its message queue. Any node closer to the data sink than node j can send this acknowledgement. The same transmission may serve as an acknowledgement for multiple nodes. Furthermore, no other node(s) m in the range of nodes j and k is sending a message in the same time slots i and q, respectively. This constraint is implemented to improve the robustness of the protocol.

The fourth constraint is associated with the data aggregation of messages and determines that all status messages must have been received by the data sink with node-ID=−1.

$$\forall\, j \in \mathbb{N}: \sum_{i=1}^{K} I_{[A_{i,-1}=L_{*,j}]} \geq 1.$$

This constraint coincides with empty message stacks at all nodes. Further, the data sink will acknowledge receipt of all messages. The above expressions are for a simplified example. In practice additional constraints are implemented to increase fault tolerance of the network.

In order to test the performance of the position-based broadcast protocol and to compare it with other (TDMA) protocols, detailed simulations were made of the performance of a mesh network comprising 900 sensor nodes and one data sink. The sensor nodes were positioned in 3 rows, 10 meters apart and extending over 3 km thereby forming a network layout which is similar to the networks described with reference to FIGS. 6 and 7. Such networks are typical for seismic studies carried out in the field of oil and gas exploration.

Figure 9B:
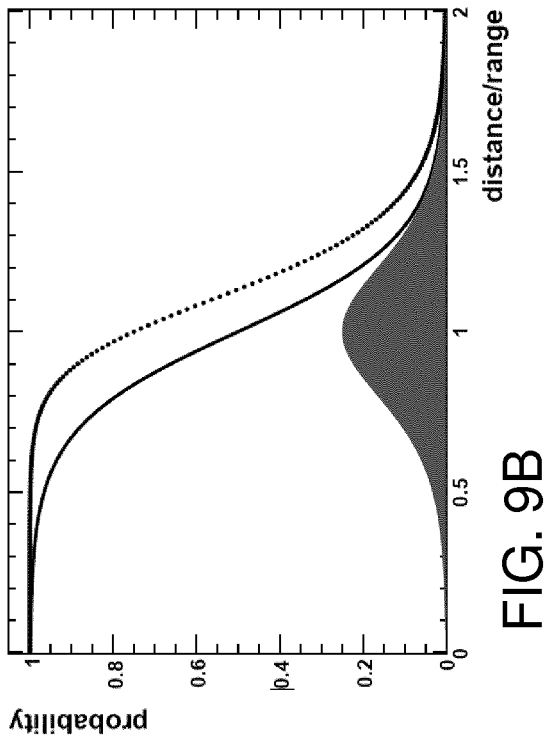
FIG. 9A-9C depicts the performance of the position-based time slot assignment schedule compared to other time slot assignment schemes.
Figure 9A:
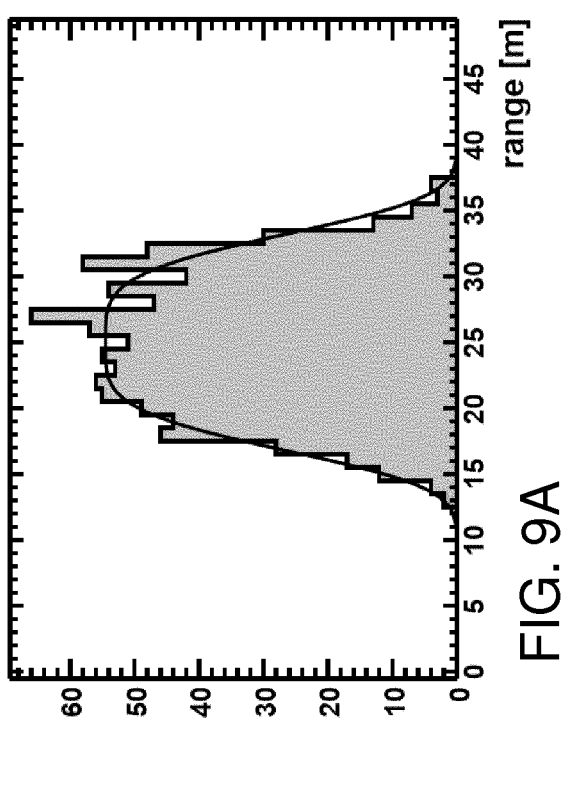

The radio traffic was simulated in the following manner: for each sensor, a random number was drawn from a probability density function that describes the range in which 50 percent of the transmitted messages can be deciphered. Since the sensors in each row may receive messages from each other, the average range should be in the order of 25 m, i.e. an average transmission range that is very well feasible with existing low-power radio units. It is assumed that there is a spread in radio power (based on the radio, the antenna, and the placement in the field). For a Gaussian distribution in power, one would expect a distribution that is Gaussian in range-squared. Therefore, the average range for a sensor is drawn from the following probability density distribution:

$$pdf(r) = N \exp[-(r-R_0)^4/2\sigma^2],\ \sigma = (0.3 R_0)^2$$

with N the normalization constant and $R_0$ 25 meter. A histogram of the average ranges of the 901 radios used in the simulation is shown in FIG. 9A. The solid curve in this histogram is given by 901 times the probability density function from which the random average ranges are drawn.

For each individual transmission, the probability is calculated that the message can be received. This probability is a function of the distance between transmitting node and the node that is in receiving mode. The probability may depend on the range of the transmitting node and may have a Woods-Saxon shape:

$$X = 1/[1+\exp\{-(d-r)/0.15r\}]$$

in which X denotes the probability that a message can be deciphered, r equals the average range of the transmitting node (shown in the histogram in FIG. 9A) and d the distance between transmitting node and receiving node. The probability as a function of the normalized distance d/r is shown in FIG. 9B.

It is possible that several nodes are transmitting data at the same time. It is assumed that the probability that a transmission of a node interferes with the transmission of another node is slightly larger: the range in which this can happen is shown by the dotted curve in FIG. 9B. The shaded area at the bottom of the graph is given by the difference between those two distributions: it shows the probability as a function of distance between a transmitting node and a receiving node that the signal is too weak to be deciphered, but strong enough to cause collision with another message transmitted at the same time.

When a receiving node detects two transmissions in the same time slot, it is assumed that a collision occurs and that the data are lost. For every time slot, all transmitted messages are checked against collisions in all receiving nodes via this mechanism. For each pair of nodes and each transmitted message, new random numbers are drawn according to the distributions in FIG. 9B.

In the position-based broadcast protocol, time slots for receiving, transmitting, and sleeping (idle) slots are distributed (assigned) based on the position of the node in the grid. In an embodiment, the nodes may be configured to calculate these slots themselves so that no location service is necessary.

The simulations were performed for a mesh network that is similar to the one described with reference to FIGS. 6 and 7. In that example, each node may listen to the neighbors in all three rows of its own column, the upstream column, and the downstream column. Hence, per frame there are 8 receive slots and 1 transmit slot. It is assumed that every 6 seconds a new status message is generated in each node. Further, it is assumed that during 1 transmit slot 9 different status messages can be sent and that there are 1024 time slots per second.

For the simulation a frame of 90 slots is used: 81 idle slots and 9 active slots, for all nodes. The delivery in time of 99 produced messages per node is examined. In order to avoid filling up the message queues of the nodes, messages older than 15 seconds were deleted. As will be discussed hereunder in more detail, the simulations show that all 99 messages of all 3000 nodes arrive in the data collection center (and each within 6 seconds after generation). Hence, the delivery of the messages is extremely robust. Each transmitted message may be delivered to 3 downstream nodes. In any column of 3 nodes, 2 nodes may break down without seriously degrading the overall throughput.

In a further embodiment, a less robust but more energy-efficient TDMA schedule may be implemented, e.g. a schedule in which each node only listens to its neighbors in the same row in the 3-row network. In such a TDMA schedule, with a frame of 100 slots, a node has only two active receive slots, one active transmit slot and 97 idle slots. The simulations show that also in this schedule all generated messages of all 900 sensors in the network arrive at the data sink.

The position-based time slot assignment was compared with a forward flooding scheme wherein all nodes broadcast their messages, and wherein the receiving nodes decide whether they need to retransmit the message. In order to simulate an optimally efficient forward-flooding, it is assumed that the forward flooding protocol follows the directional rules as described with reference to FIG. 4A: a node closer to the data sink may retransmit received messages until it receives an acknowledgement. Acknowledgement may be received when a node closer to the data sink (or the data sink itself) retransmits a message. Slotted ALOHA TDMA scheduling was used for the time slot assignment.

In the simulations, results were studied for a scheme in which 9, 12, or 15 active slots are used (1 randomly assigned transmit slot and 8, 11, or 14 receive slots) and 9 times as many idle slots. The idle slots are coherently spread in time over the full network. In this manner, the radio power consumption of these schemes is similar to the power consumption of the first simulation of our protocol above. In these schemes, a large fraction of the messages do not arrive at the data sink. For standard ALOHA, in which one analyzes the probability that a message is transferred from one node to another node, one would expect that the performance with 15 active slots would be best (and about 1/e times as efficient as our slot assignment protocol), since there are on average about 15 neighbors in range to transmit or cause a collision. However, the fact that not all forward nodes need to receive the message and that in this forward flooding protocol a message may skip one or 2 columns and progress forward more quickly, negates this standard analytic prediction. Simulations show that 9 and 12 active slots perform slightly better than 15 slots.

Figure 9C:
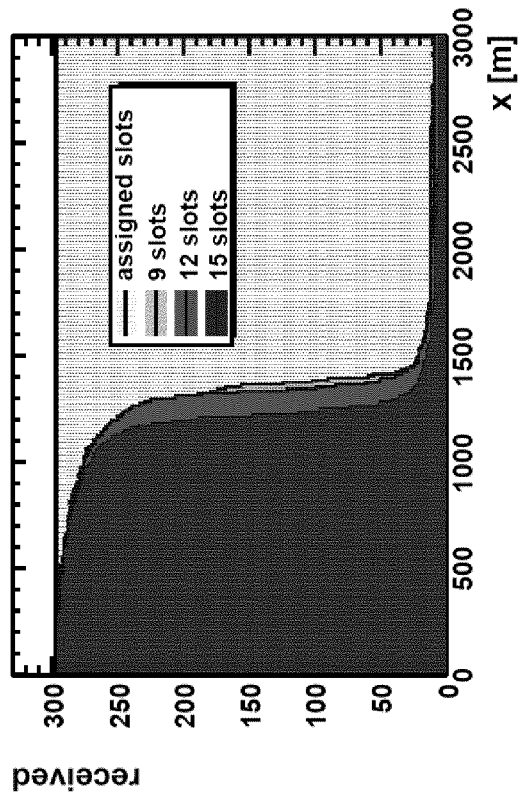

FIG. 9C depicts the amount of messages that arrive at the data sink in the 594 seconds after transmission of the first message, as a function of the distance along the row. When using the position-based time slot assignment scheme all messages arrive at the data sink, both for the case in which 8 receive slots per frame are allocated (and 90 percent idle time) or in which only 2 receive slots are allocated (97 percent idle time).

For the forward flooding protocol with random slot assignment, only about half the messages arrive. From FIG. 9C it can be seen that after one minute, when the message queues in the network are filled, the messages of the end of the line (further than 1500 m from the data sink) have a small probability to be transported in time to the data sink. One may recover full message delivery by allowing more active slots. Further simulations show that in order to obtain equal performance as the position-based slot assignment (all messages delivered within 5 seconds after generation and no congestion), a minimum of 34 percent active slots is needed (compared to 3 percent active slots for our protocol). This demonstrates the improvements one can obtain with position-based slot assignment.

Hence, from the above, it follows that position awareness of the sensor devices in the mesh network is used for determining a time slot schedule. An optimal schedule may be derived for a different configuration by designing an appropriate cost function, which can be minimized by solving a linear set of equations. Various requirements may be incorporated and depending on the weight of these requirements, the result of the minimization of the cost function will be different. The cost function may also depend on the amount of messages that may be sent or confirmed per transmit slot.

The time slot schedule in the position-based broadcast protocol is completely flexible. Close to optimal ad-hoc schedules as illustrated in the examples above can be calculated by the nodes themselves. Additionally, software may be distributed inside the network that instructs the node to use the optimal time slot schedule that results from the minimization problem above. In this manner, the protocol supports using a mathematically derived optimal solution for the time slot schedule.

Figure 10A:
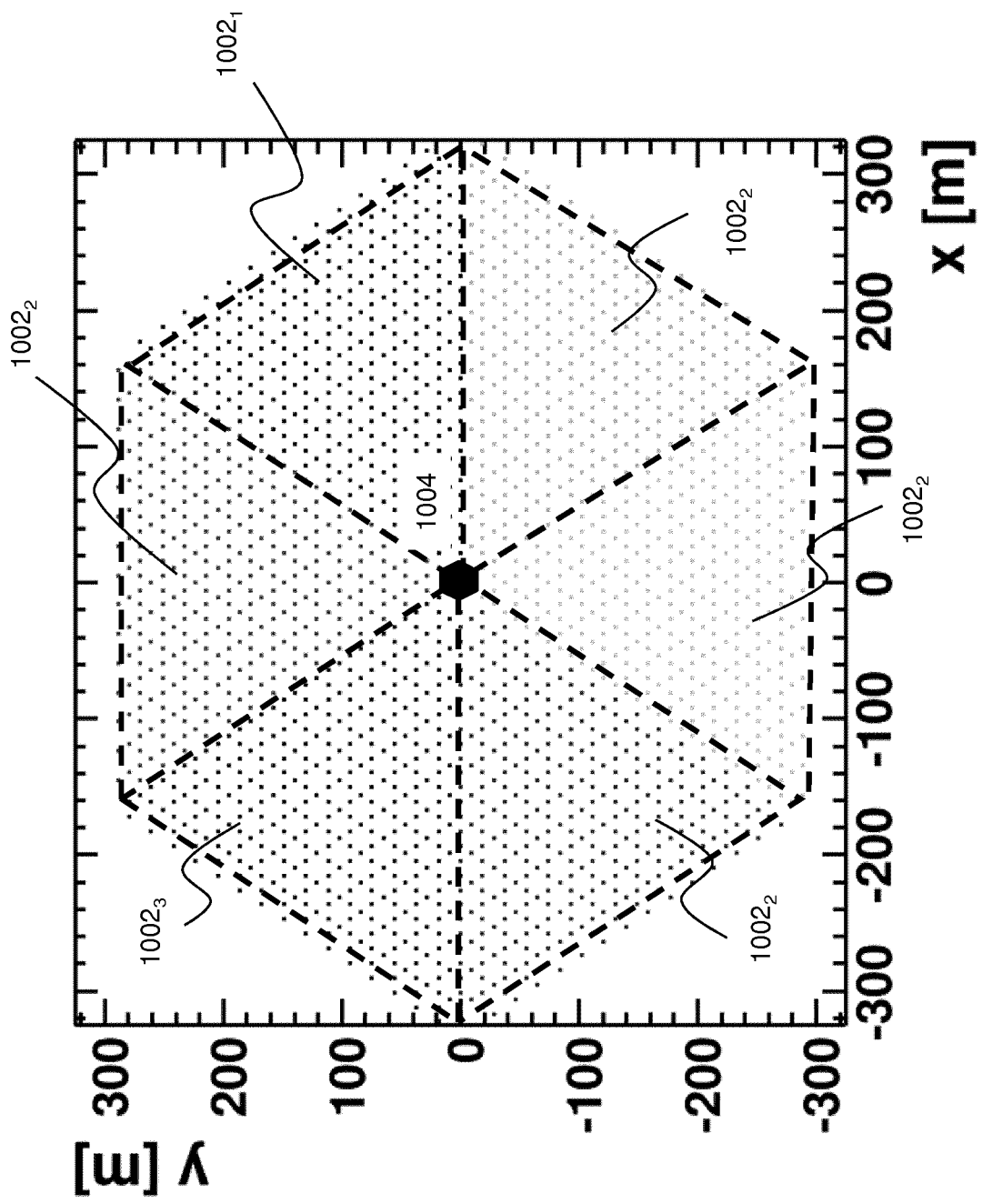
FIGS. 10A and 10B depict the performance of a position based TDMA in combination with a position-based FDMA schedule.
Figure 10B:
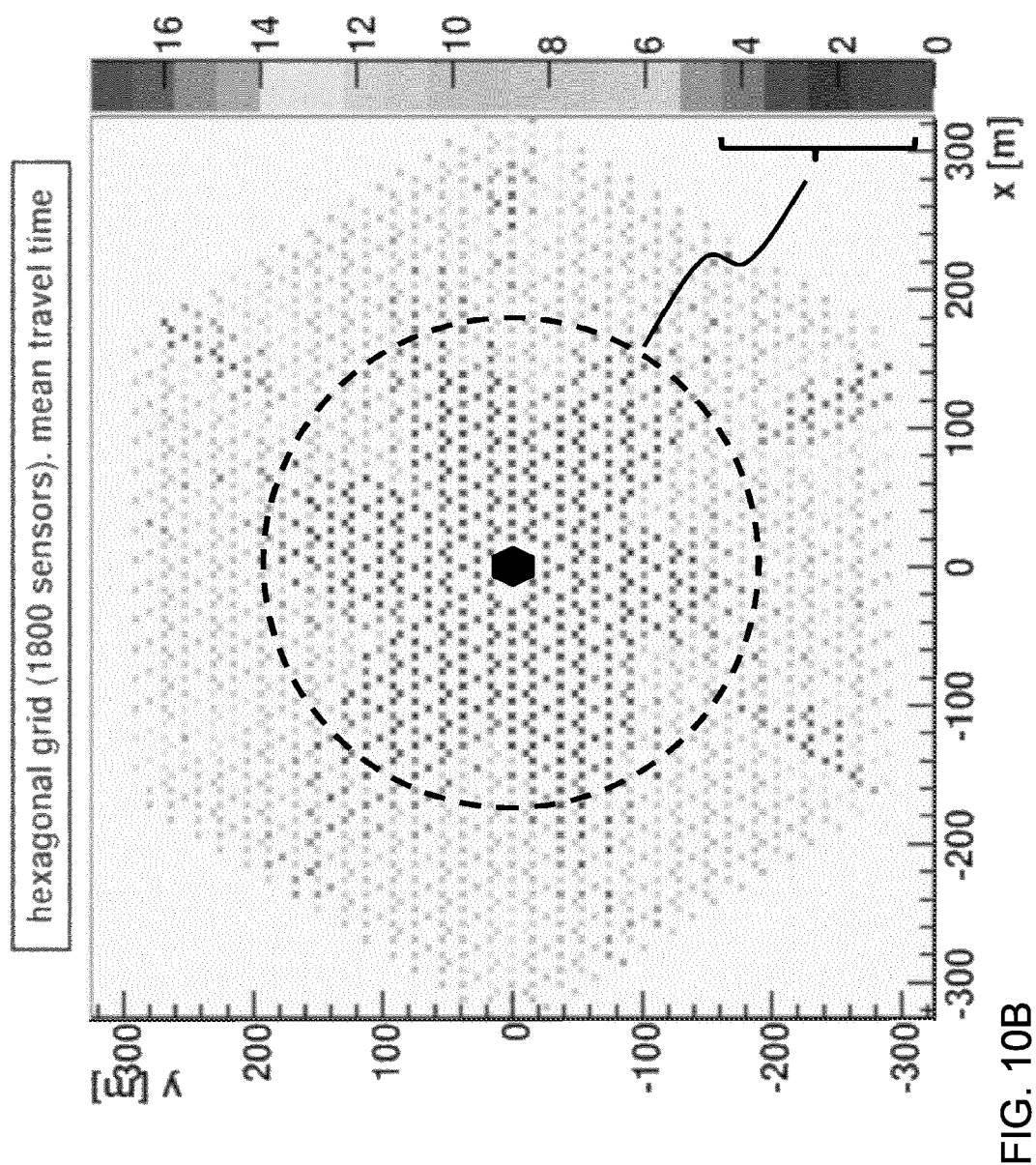

FIGS. 10A and 10B depict the performance of a position based TDMA in combination with a position-based FDMA schedule. In this particular embodiment, a hexagonal shaped mesh network may be defined by a grid layout that is known to all nodes in the network. At the center of he hexagonal mesh network a data sink is located at a position that is also known to the nodes. An FDMA schedule may be applied to the network wherein a transmission frequency is assigned to a node based on its position in the network. In particular, a transmission frequency may be assigned to all or at least a substantial part of the nodes in one or more (triangular) sub-networks $1002_{1-6}$ of the hexagonal mesh network.

FIG. 10B depicts the mean delay between the generation of a status message at a node and the reception of the status message by the data sink. The figure shows that messages generated by nodes within the area denoted by the circle have a low mean travel time despite the fact that the nodes close to the data sink will have to retransmit a substantial number of messages from nodes that are located further away from the data sink. Hence, using a position-based FDMA schedule the nodes may use different frequency bands for the broadcast communication. In this manner, the nodes assigned to different sub-networks can transmit and receive without interfering with the operation of other sub networks.

The modules and functions describe in this disclosure may be implemented as one or more hardware devices, e.g. one or more (dedicated) microprocessors, as one or more software programs, i.e. software code portions configured for, when run in the memory associated with a computer or a microprocessor that is configured to execute the code in order to produce the desired functionality; or, as a combination of hardware devices and software programs.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The invention is not limited to the embodiments described above, which may be varied within the scope of the accompanying claims.

The invention claimed is:

1. A method for managing communication in a mesh network, the method comprising:
   receiving or determining, by a processor of a first wireless node, a grid layout of the mesh network and storing the grid layout in a memory of the first wireless node, the grid layout representing an array of grid cells, a grid cell having a predetermined shape, the array of grid cells defining positions of wireless nodes of the mesh network, wherein at least one wireless node is configured as a data sink;
   executing a first time-scheduler by the processor of the first wireless node, the executing including:
      determining or receiving, by the first time-scheduler, a time slot schedule, the time slot schedule comprising at least three time slots, including a transmission time slot enabling a radio transceiver in the first wireless node to transmit a broadcast message, a reception time slot enabling the radio transceiver in the first wireless node to receive a broadcast message from one or more other wireless nodes, and, a sleep time slot for configuring the first wireless node in an idle state;
      determining a position of the first wireless node and a position of a data sink in the mesh network based on the grid layout; and, assigning at least one of the three time slots, by the first time-scheduler, to the first wireless node based on the position of the first wireless node and the position of the data sink.

2. The method according to claim 1 wherein assigning the at least one of the three time slots comprises assigning a transmission time slot.

3. The method according to claim 2, the method further comprising:
assigning, by a second time-scheduler of a second wireless node located outside a transmission range of the first wireless node, a sleep time slot to the second wireless node, wherein the sleep time slot at least partially overlaps in time with the transmission time slot assigned to the first wireless node.

4. The method according to claim 2, the method further comprising:
assigning, by a second time-scheduler of a second wireless node, a transmission time slot to the second wireless node that at least partly overlaps in time with the transmission time slot assigned to the first wireless node, wherein a distance between the first wireless node and the second wireless node is larger than a predetermined minimum distance.

5. The method according claim 2, the method further comprising:
retransmitting, by the processor of the first wireless node, a first broadcast message that was transmitted in an earlier time slot to the first wireless node by a processor of a second wireless node, wherein the first broadcast message is retransmitted by the processor of the first wireless node if a first distance between the first wireless node and the data sink is smaller than a second distance between the second wireless node and the data sink.

6. The method according claim 5, the method further comprising:
before the retransmission of the first broadcast message by the processor of the first wireless node, modifying, by the first wireless node, the first broadcast message into a second broadcast message by inserting node identification information associated with the first wireless node in the first broadcast message.

7. The method according to claim 5, the method further comprising:
receiving, by the second wireless node, the first broadcast message that was retransmitted by the first wireless node; and
interpreting, by the second wireless node, the reception of the first broadcast message as an acknowledgement that the first broadcast message was retransmitted to a wireless node that is positioned closer to the data sink than the second wireless node.

8. The method according to claim 5 wherein the first broadcast message comprises at least one of: a message identifier for uniquely identifying the first broadcast message, retransmission node identification information associated with the second wireless node; and/or originating node identification information associated with a wireless node in the mesh network which generated the first broadcast message.

9. The method according to claim 2, the method further comprising:
assigning, by a second time-scheduler of a second wireless node located within a transmission range of the first wireless node, a reception time slot to the second wireless node, wherein the reception time slot at least partially overlaps in time with the transmission time slot assigned to the first wireless node.

10. The method according to claim 1 wherein the time slot schedule comprises a predetermined first number of reception time slots and a predetermined second number of sleep time slots, and wherein the first number of reception time slots and the second number of sleep time slots are selected such that, during execution of the time slot schedule by the first time-scheduler, at least 50% of the wireless nodes in the mesh network are in idle state.

11. The method according to claim 1 wherein the time slot schedule is determined based on a minimization procedure, the minimization procedure including minimizing a cost function representing a total power of the mesh network:

$$\sum_s P_s \sum_{i=1}^{K} \sum_{j=1}^{N} I_{[A_{ij}=s]}, \text{ for } s = T, L, S,$$

wherein Ps is a power of a wireless node in the mesh network that is in a state s wherein the state s of a wireless node includes a transmission state T, a listening state L and a sleep state S; and,
wherein a solution of the minimization procedure is a time slot allocation matrix A with dimension (K×N) where N is a total number of wireless nodes in the mesh network and K is a number that exceeds a total number of time slots needed to receive all broadcast messages at a data sink of the mesh network, a row in the allocation matrix A corresponding to at least part of a time slot and a column in the allocation matrix corresponding to a wireless node identifier of a node in the mesh network.

12. The method according to claim 11 wherein the cost function is minimized according to the minimization procedure using one or more of the following constraints:
equal power consumption for the wireless nodes in the mesh network;
minimum power consumption;
minimum delay time from data acquisition by a wireless node in the mesh network to reception of a message comprising acquired data at a data sink in the mesh network;
maximum data throughput through the mesh network;
minimum collisions of messages transmitted by the wireless nodes in the mesh network;
the time slot schedule comprising consecutive active slots and idle slots;
an amount of idle slots; and
an amount of wireless nodes with an active receive time slot in a neighborhood of a transmitting wireless node.

13. The method according to claim 1 wherein the wireless nodes of the mesh network are static time-synchronized wireless nodes.

14. The method according to claim 1, the method further comprising:
assigning, by the first time-scheduler, a broadcast transmission frequency and message reception frequency to the first wireless node, wherein the broadcast transmission frequency and the message reception frequency are selected on a basis of the position of the first wireless node in the mesh network.

15. The method according to claim 1 wherein a length of the time slots and/or a length of broadcast messages transmitted by the wireless nodes in the mesh network is of a predetermined fixed length.

16. The method according to claim 1 wherein a length of a broadcast message transmitted by a wireless node in the mesh network is selected such that the broadcast message can be transmitted and/or received within a duration of a time slot.

17. The method according to claim 1, wherein the time slot schedule is a TDMA time slot schedule.

18. A wireless node for a mesh network, the wireless node comprising:
- a memory comprising a grid layout representing an array of grid cells, a grid cell having a predetermined shape, the array of grid cells defining positions of wireless nodes of the mesh network, wherein at least one wireless node is configured as a data sink;
- a processor connected to the memory, the processor being configured to execute a time slot scheduler configured for:
    - determining or receiving, by a first time-scheduler, a time slot schedule, the time slot schedule comprising at least three time slots, including a transmission time slot enabling a radio transceiver in the wireless node to transmit a broadcast message, a reception time slot enabling the radio transceiver in the wireless node to receive a broadcast message from one or more other wireless nodes, and, a sleep time slot for configuring the wireless node in an idle state;
    - determining a position of the wireless node and a position of the data sink in the mesh network on the basis of the grid layout; and,
    - assigning at least one of the three time slots, by the first time-scheduler, to the wireless node based on the position of the wireless node and the position of the data sink.

19. The wireless node according to claim 18, wherein the memory comprises a message queue, the message queue comprising a first broadcast message, the first broadcast message being transmitted in an earlier time slot by a further wireless node in the mesh network to the wireless node.

20. The wireless node according to claim 18, the wireless node further comprising:
- a communication module connected to the processor, the communication module comprising a radio frequency transceiver configured to retransmit a first broadcast message if a first distance between the wireless node and the data sink in the mesh network is smaller than a second distance between a further wireless node and the data sink in the mesh network.

21. The wireless node according to claim 18, wherein the time slot schedule is a TDMA time slot schedule.

\* \* \* \* \*